US008688721B2

(12) United States Patent
Josifovski et al.

(10) Patent No.: US 8,688,721 B2
(45) Date of Patent: Apr. 1, 2014

(54) QUERY EVALUATION USING ANCESTOR INFORMATION

(75) Inventors: Vanja Josifovski, Los Gatos, CA (US); Edison L. Ting, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 352 days.

(21) Appl. No.: 13/113,657

(22) Filed: May 23, 2011

(65) Prior Publication Data

US 2011/0225144 A1    Sep. 15, 2011

(51) Int. Cl.
G06F 7/00    (2006.01)
G06F 17/30    (2006.01)

(52) U.S. Cl.
USPC .......................................... 707/755

(58) Field of Classification Search
USPC .................. 707/755, 759, 773, 775
See application file for complete search history.

(56) References Cited

U.S. PATENT DOCUMENTS

| 6,920,462 | B2 | 7/2005 | Kircher |
| 7,596,548 | B2 | 9/2009 | Josifovski et al. |
| 2003/0088558 | A1 | 5/2003 | Zaharioudakis et al. |
| 2003/0163285 | A1 | 8/2003 | Nakamura et al. |
| 2003/0212662 | A1 | 11/2003 | Shin et al. |
| 2003/0233618 | A1 | 12/2003 | Wan |
| 2004/0034830 | A1 | 2/2004 | Fuchs et al. |
| 2004/0060007 | A1 | 3/2004 | Gottlob et al. |
| 2004/0068487 | A1 | 4/2004 | Barton et al. |
| 2004/0073541 | A1 | 4/2004 | Lindblad et al. |
| 2004/0083209 | A1 | 4/2004 | Shin |
| 2004/0122795 | A1 | 6/2004 | Lin et al. |
| 2004/0167864 | A1 | 8/2004 | Wang et al. |
| 2004/0193607 | A1 | 9/2004 | Kudo et al. |
| 2004/0205082 | A1 | 10/2004 | Fontoura et al. |
| 2004/0260691 | A1 | 12/2004 | Desai et al. |
| 2005/0021548 | A1 | 1/2005 | Bohannon et al. |
| 2005/0028091 | A1 | 2/2005 | Bordawekar et al. |
| 2005/0050016 | A1 | 3/2005 | Stanoi et al. |
| 2005/0055336 | A1 | 3/2005 | Hui et al. |
| 2005/0097084 | A1 | 5/2005 | Balmin et al. |
| 2005/0257201 | A1 | 11/2005 | Rose et al. |
| 2006/0106758 | A1 | 5/2006 | Chen et al. |
| 2007/0174241 | A1 | 7/2007 | Beyer et al. |
| 2009/0287700 | A1 | 11/2009 | Josifovski et al. |

OTHER PUBLICATIONS

Gang Gou and Rada Chirkova, Efficient Algorithms for Evaluating Xpath over Streams, SIGMOD'07, published Jun. 2007.*

(Continued)

*Primary Examiner* — Jeffrey A Burke
(74) *Attorney, Agent, or Firm* — Konrad Raynes Davda & Victor LLP; Janaki K. Davda

(57) ABSTRACT

Provided are techniques for processing a query. A query is received, wherein the query is formed by one or more paths, and wherein each path includes one or more steps. A hierarchical document including one or more document nodes is received. While processing the query and traversing the hierarchical document, one or more extraction entries are constructed, wherein each extraction entry includes a step instance match candidate identifying a document node and a step instance ancestor path for the document node, and one or more tuples are constructed using the one or more extraction entries by associating the step instance match candidate from one of the one or more extraction entries with the step instance match candidate from at least one of the one or more other extraction entries.

9 Claims, 33 Drawing Sheets

(56) References Cited

OTHER PUBLICATIONS

Bar-Yossef, Z., M. Fontoura, and V. Josifovski, "Buffering in Query Evaluation Over XML Streams," Proceedings of the Twenty-fourth ACM SIGMOD-SIGACT-SIGART Symposium on Principles of Database Systems, Jun. 2005, Total 12 pp.

Chen, Q., A. Lim, and K.W. Ong, "D(K)-Index: An Adaptive Structural Summary for Graph-Structured Data", Proceedings of the 2003 ACM SIGMOD International Conference on Management of Data, Jun. 2003, Total 11 pp.

Diao, Y., D. Florescu, D. Kossmann, M.J. Carey, and M.J. Franklin, "Implementing Memoization in a Streaming XQuery Processor," Proceedings of the 2nd International XML Database Symposium, 2004, Total 15 pp.

Florescu, D., C. Hillery, D. Kossmann, P. Lucas, F. Riccardi, T. Westmann, M.J. Carey, and A. Sundararajan, "The BEA Streaming XQUERY Processor," VLDB Journal, 2004, Total 25 pp.

Florescu, D., C. Hillery, D. Kossmann, P. Lucas, F. Riccardi, T. Westmann, M.J. Carey, A. Sundararajan, and G. Agrawal, "The BEA/XQRL Streaming XQuery Processor", Proceedings of the 29th VLDB Conference, 2003, Total 12 pp.

Garshol, L.M., "BNF and EBNF: What are they and how do they work?", [online], [Retrieved on Dec. 21, 2007]. Retrieved from the Internet at <URL: http://www.garshol.priv.no/download/text/bnf.html>, last updated Jul. 21, 2003, Total 16 pp.

Jian, J., "Efficient XML Stream Processing with Automata and Query Algebra", Thesis, Aug. 2003, Total 90 pp (Also pp. 1-90).

Josifovski, M. Fontoura, and A. Barta, "Querying XML Streams", The VLDB Journal, 2004, Total 14 pp.

Kreowski, H., "A Pumping Lemma for Context-Free Graph Languages", Proceedings of the International Workshop on Graph-Grammars and Their Application to Computer Science and Biology, 1978, Total 14 pp.

Little, S., "Tree::Simple—1.14", [online], [Retrieved on Dec. 25, 2007]. Retrieved from the Internet at <http://search.cpan.org/~stevan/Tree-Simple-1.14/lib/Tree/Simple.pm>, © 2004 Infinity Interactive, Inc., Total 12 pp.

PCT Invitation to Pay Additional Fees and International Search Report, May 2, 2007, for International Application No. PCT/EP2007/050292, Total 6 pp.

Rahm, E., H. Do, and S. Mabmann, "Matching Large XML Schemas", SIGMOD Record, vol. 33, No. 4, Dec. 2004, Total 6 pp (Also pp. 1-6).

Wikipedia, "Pumping Lemma for Context-Free Languages", [online], modified Apr. 25, 2008, [retrieved on Jun. 23, 2008], retrieved from the Internet at <URL: http://en.wikipedia.org/wiki/Pumping_lemma_for_Context-Free_Languages>, Total 5 pp.

Wikipedia, "Surjective Function", [online], modified Jun. 17, 2008, [retrieved on Jun. 23, 2008], retrieved from the Internet at <URL: http://en.wikipedia.org/wiki/Surjection>, Total 5 pp.

Amendment 1, Jul. 11, 2008, for U.S. Appl. No. 11/336,140, Total 10 pp.

Amendment 2, Feb. 12, 2009, for U.S. Appl. No. 11/336,140, Total 8 pp.

Notice of Allowance 1, Nov. 20, 2008, for U.S. Appl. No. 11/336,140, Total 13 pp.

Notice of Allowance 2, May 12, 2009, for U.S. Appl. No. 11/336,140, Total 12 pp.

Office Action 1, Apr. 11, 2008, for U.S. Appl. No. 11/336,140, Total 22 pp.

Office Action 1, Sep. 13, 2010, for U.S. Appl. No. 12/537,983, Total 15 pp.

Amendment 1, Dec. 13, 2010, for U.S. Appl. No. 12/537,983, Total 10 pp.

Notice of Allowance 1, Mar. 1, 2011, for U.S. Appl. No. 12/537,983, Total 11 pp.

* cited by examiner

| Looking For | | Parent Step Instance ID | Matching Step Instance ID |
|---|---|---|---|
| tag | level | | |
| | | | |

| Step Instance Match Candidate | Step Instance Ancestor Path |
|---|---|
|  |  |

FIG. 8

| Step Instance Match Candidate | Step Instance Ancestor Path |
|---|---|
| c[4] | root[1], a[2], b[3], c[4] |

FIG. 9

| Step Instance Match Candidate | Step Instance Ancestor Path |
|---|---|
| d[7] | r[1], a[2], b[3], c[4], d[7] |

— 1910

| Step Instance Match Candidate | Step Instance Ancestor Path |
|---|---|
| d[7] | r[1], a[2], b[3], c[6], d[7] |

— 1920

| Step Instance Match Candidate | Step Instance Ancestor Path |
|---|---|
| d[7] | r[1], a[2], b[5], c[6], d[7] |

| Step Instance Match Candidate | Step Instance Ancestor Path |
|---|---|
| d[7] | r[1], a[2], b[3], c[4], d[7] |

— 1910

| Step Instance Match Candidate | Step Instance Ancestor Path |
|---|---|
| d[7] | r[1], a[2], b[3], c[6], d[7] |

— 1920

| Step Instance Match Candidate | Step Instance Ancestor Path |
|---|---|
| d[7] | r[1], a[2], b[5], c[6], d[7] |

— 1930

| Step Instance Match Candidate | Step Instance Ancestor Path |
|---|---|
| d[8] | r[1], a[2], b[3], c[4], d[8] |

| Step Instance Match Candidate | Step Instance Ancestor Path |
|---|---|
| c[4] | r[1], a[2], b[3], c[4] |

2310

| Step Instance Match Candidate | Step Instance Ancestor Path |
|---|---|
| c[6] | r[1], a[2], b[3], c[6] |

2320

| Step Instance Match Candidate | Step Instance Ancestor Path |
|---|---|
| c[6] | r[1], a[2], b[5], c[6] |

2330

| Step Instance Match Candidate | Step Instance Ancestor Path |
|---|---|
| e[7] | r[1], a[2], b[3], e[7] |

2340

| Step Instance Match Candidate | Step Instance Ancestor Path |
|---|---|
| e[7] | r[1], a[2], b[5], e[7] |

| Step Instance Match Candidate | Step Instance Ancestor Path |
|---|---|
| c[4] | r[1], a[2], b[3], c[4] |

2310

| Step Instance Match Candidate | Step Instance Ancestor Path |
|---|---|
| c[6] | r[1], a[2], b[3], c[6] |

2320

| Step Instance Match Candidate | Step Instance Ancestor Path |
|---|---|
| c[6] | r[1], a[2], b[5], c[6] |

2330

| Step Instance Match Candidate | Step Instance Ancestor Path |
|---|---|
| e[7] | r[1], a[2], b[3], e[7] |

2340

| Step Instance Match Candidate | Step Instance Ancestor Path |
|---|---|
| e[7] | r[1], a[2], b[5], e[7] |

2350

| Step Instance Match Candidate | Step Instance Ancestor Path |
|---|---|
| e[8] | r[1], a[2], b[3], e[8] |

QUERY EVALUATION USING ANCESTOR INFORMATION

CROSS REFERENCE TO RELATED APPLICATION

This application is a continuation application of and claims the benefit U.S. application Ser. No. 12/537,983, filed on Aug. 7, 2009, which is a divisional application of U.S. Pat. No. 7,596,548, having U.S. application Ser. No. 11/336,140 and filed on Jan. 20, 2006, the entire contents of each of which is incorporated herein by reference.

BACKGROUND

1. Field

Embodiments of the invention relate to query evaluation using ancestor information.

2. Description of the Related Art

Extensible Markup Language (XML) may be described as a flexible text format. XML is a formal recommendation from the World Wide Web Consortium (W3C). XML contains markup symbols to describe the contents of a document. In particular, XML describes the content in terms of what data is being described. Thus, an XML document may be processed as data by a program or may be stored with similar data. XML is "extensible" in that the markup symbols are self-defining. XML is a subset of the Standard Generalized Markup Language (SGML), which is a standard for how to create a document structure.

XML Path Language (XPath) is a language that describes a way to locate and process items in XML documents by using an addressing syntax based on a path through the logical structure or hierarchy of the document. That is, XPath is a language for addressing parts of an XML document.

XML Query (XQuery) provides query facilities to extract data from documents and collections. XQuery is a specification for a query language that allows a user or programmer to extract information from an XML document or any collection of data that is similar in structure to an XML document.

XQuery makes use of XPath. In XQuery, XPath expressions may be simple queries or parts of larger queries.

Notwithstanding existing techniques for processing XML queries, there is a need in the art for improved processing of XML queries.

SUMMARY OF EMBODIMENTS OF THE INVENTION

Provided are a method, computer program product, and system for processing a query. A query is received, wherein the query is formed by one or more paths, and wherein each path includes one or more steps. A hierarchical document including one or more document nodes is received. While processing the query and traversing the hierarchical document, one or more extraction entries are constructed, wherein each extraction entry includes a step instance match candidate identifying a document node and a step instance ancestor path for the document node, and one or more tuples are constructed using the one or more extraction entries by associating the step instance match candidate from one of the one or more extraction entries with the step instance match candidate from at least one of the one or more other extraction entries.

BRIEF DESCRIPTION OF THE DRAWINGS

Referring now to the drawings in which like reference numbers represent corresponding parts throughout:

FIG. 3 illustrates a LookingFor node in a LookingFor structure in accordance with certain embodiments;

FIG. 8 illustrates an extraction entry structure in accordance with certain embodiments;

FIG. 9 illustrates an extraction entry in accordance with certain embodiments;

FIG. 19 illustrates extraction entries created for a document including recursive nodes that are described by XPath steps using a descendant axis in accordance with certain embodiments;

FIG. 20 illustrates extraction entries in accordance with certain embodiments;

FIG. 23 illustrates extraction entries created for a document and a query with multiple extractions and recursive nodes in accordance with certain embodiments;

FIG. 24 illustrates additional extraction entries created for a document and a query with multiple extractions and recursive nodes in accordance with certain embodiments;

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
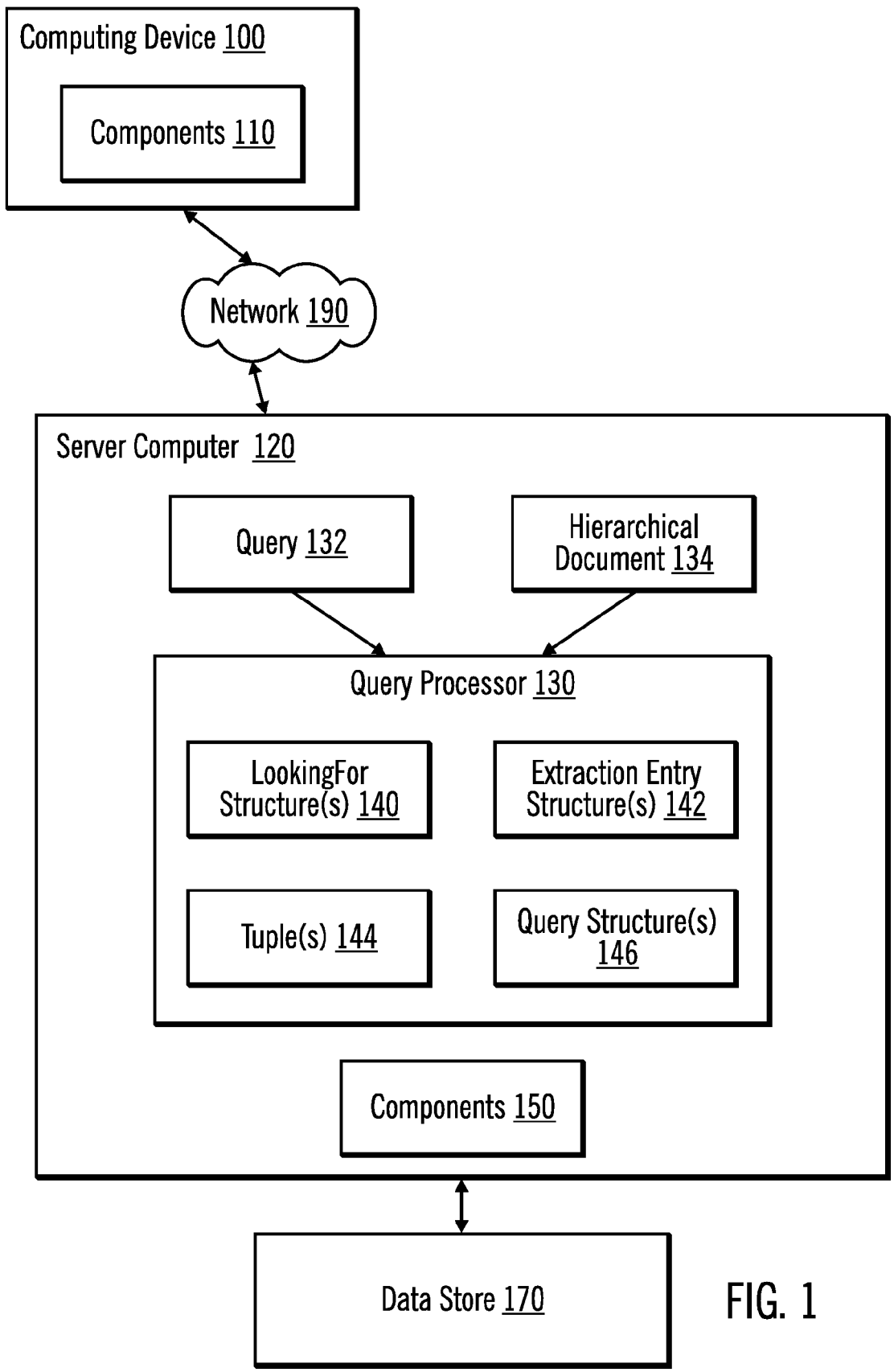
FIG. 1 illustrates details of a computing device in accordance with certain embodiments.

FIG. 1 illustrates details of a computing device in accordance with certain embodiments. A client computer 100 is connected via a network 190 to a server computer 120. The client computer 100 includes components 110 (e.g., one or more client applications).

The server computer 120 includes a query processor 130 and may include one or more additional components 150 (e.g., server applications). The server computer 120 is coupled to a data store 170. The query processor 130 receives a query 132 (e.g., an XQuery) and a hierarchical document 134 (e.g., an XML document) as input. A query 132 may be described as being formed by one or more paths, where each path includes one or more steps. A hierarchical document 134 may be described as including one or more document nodes. During processing of the query 132 with reference to the hierarchical document 134, the query processor 130 builds one or more LookingFor structures 140 and one or more extraction entry structures 142, which are described in further detail below. The LookingFor structures 140 include LookingFor nodes. In certain embodiments, the LookingFor structures may be LookingFor trees. The extraction entry structures include extraction entries and may be described as intermediate results. Also, the query processor 130 may either generate a query structure 146 for each query 132 or may generate a query structure 146 for a group of queries. The query processor 130 uses information in the extraction entries in the extraction entry structures 142 and uses the query structure 146 to construct one or more tuples 144, which form the results of processing the query 132 with reference to the hierarchical document 134.

A hierarchical document 134 may be described as being composed of nodes that are related to each other. The topmost node is called a root node, and the root node is the only node that has no parent. A node may have one or more child nodes, also referred to as children. Nodes without child nodes are called leaf nodes. Ancestor nodes may be described as the nodes between a particular node and the root node. Descendant nodes of a particular node may be described as the nodes which have that particular node as an ancestor node. Embodiments are applicable to any query language that uses paths. A path in a query describes a path of traversal to get to one or more nodes to be returned when the query is applied to a hierarchical document. A path for a particular node in a hierarchical document may be described as one or more sequences of nodes in the hierarchical document that reach the particular node and are along the path described in the query. In certain embodiments, the hierarchical document 134 is an XML document. In certain embodiments, the query 132 is an XQuery made up of one or more XPaths.

The client computer 100 and server computer 120 may comprise any computing device known in the art, such as a server, mainframe, workstation, personal computer, hand held computer, laptop telephony device, network appliance, etc.

The network 190 may comprise any type of network, such as, for example, a peer-to-peer network, spoke and hub network, Storage Area Network (SAN), a Local Area Network (LAN), Wide Area Network (WAN), the Internet, an Intranet, etc.

The data store 170 may comprise an array of storage devices, such as Direct Access Storage Devices (DASDs), Just a Bunch of Disks (JBOD), Redundant Array of Independent Disks (RAID), virtualization device, etc.

Although examples herein may refer to XML documents, XQueries, and/or XPaths, it is to be understood that embodiments are not limited to such examples.

Constructing Ancestor/Descendant Paths for Query Evaluation

Figure 2A:
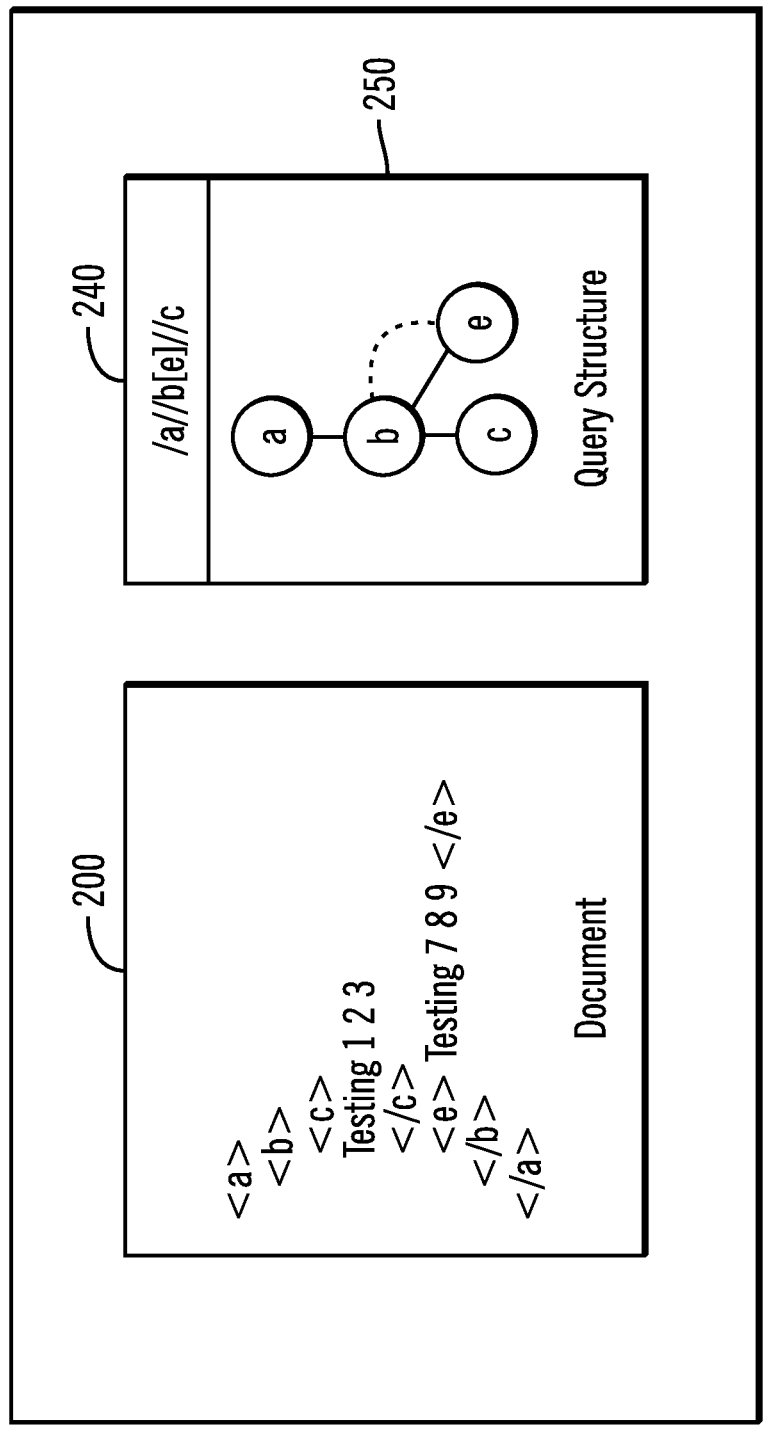
FIG. 2A illustrates a document, a query, and a query structure in accordance with certain embodiments.

FIG. 2A illustrates a hierarchical document 200, a query 240, and a query structure 250 in accordance with certain embodiments.

In certain embodiments, the hierarchical document 200 is an XML document. The hierarchical document is well-formed in that for each open tag (e.g., an <a> document node), there is a corresponding close tag (e.g., a </a> document node). In the hierarchical document 200, an <a> document node has one child <b> document node, and the <b> document node has two children: <c> and <e> document nodes. Also, the <c> and <e> document nodes do not have children.

A query structure may be described as a representation of a query. In FIG. 2A, query structure 250 represents query 240, which is /a//b[e]//c. Query 240 indicates that all <c> document nodes are to be returned where the <c> document nodes are descendants of all the <b> document nodes, where the <b> document nodes have an immediate child <e> document node, and the <b> document nodes are under <a> document nodes. For purposes of illustration, in the queries, double slashes ("V") following a step (e.g., a//) are used to represent any descendant of a particular node or the node itself in a path (i.e., a descendants axis), while single slashes ("/") are used to represent the child axis. For example, a//b indicates that a <b> document node may be at any level below an <a> document node in the hierarchical document 200. Also, in the queries, brackets ("[ ]") following a node test represent a predicate to be applied to the node test. For example, in FIG. 2A, [e] is a predicate. The query structure 250 depicts that the query processor 130 is looking for <b> document nodes that are descendants of (not just children of) <a> document nodes and that "b" is a child of "a" and an ancestor of "c" and "e". The dashed line between "b" and "e" represents that the "e" step is part of a predicate.

A path (e.g., an XPath expression) is made up of a series of steps. A step specifies: a) an axis that specifies a direction of traversal in a hierarchical document; b) a node test that selects document nodes along the axis; and c) optionally, a predicate to filter document nodes selected. A node test may be described as identifying a document node with certain features that is to be selected. A predicate may be described as identifying a feature that is used to identify certain document nodes based on a filter.

For example, in FIG. 2A, query 240 is an XPath "/a//b[e]//c" in which "/a", "//b[e]" and "//c" are steps. The "/a" step indicates a child axis ("/") and the node test selects <a> document nodes. The "//b" step indicates a descendants axis ("//") and a node test that selects <b> document nodes that satisfy the predicate [e] and that are descendants of the selected <a> document nodes. The "//c" step indicates a descendant axis and the node test selects <c> document nodes that are descendants of the selected <b> document nodes.

The last step of a path is an extraction step. For example, in FIG. 2A, "//c" is an extraction step, and <c> document nodes are being extracted from the hierarchical document 200.

Given any step in a path, document nodes in the hierarchical document that are described by that step are called step instance candidates. For example, in FIG. 2A, the <a> document node is a step instance candidate because the <a> document node is described by step "/a" of the path. A step instance candidate may also be referred to as a step instance. A step instance candidate is used to refer to a step instance that may not qualify to be returned. A document node that is described by a step may be described as a "match" for the step.

Each step instance candidate is assigned a unique identifier called a Step Instance Identifier (SIID). The SIID may be described as a monotonically increasing number that is assigned to each matching step instance candidate in the hierarchical document and that uniquely identifies the matching step instance candidate. For example, in FIG. 2A, the root of the hierarchical document 200 (not shown) is assigned SIID 1, the <a> document node is assigned SIID 2, the <b> document node is assigned SIID 3, etc.

Each step instance has an associated level. For example, in FIG. 2A, the root of the hierarchical document (not shown) is associated with Level 1), the <a> document node is associated with Level 2, the <b> document node is associated with Level 3, etc.

Given any step instance (i.e. document nodes in a hierarchical document), the document nodes that are ancestors of that step instance form a Step Instance Ancestor Path (SInAP). Each document node in the SInAP is a step instance as that document node is described by a previous step. For example, in FIG. 2A, the SInAP for the <c> document nodes is formed by the <a><b> document nodes. In certain embodiments, the SIIDs of ancestor nodes are used to form the SInAP. For example, for <c>, the SInAP is "a(2), b(3), c(4)". This may be read as: the <a> document node with the SIID of 2, the <b> document node with the SIID of 3, the <c> document node with the SIID of 4.

A query structure represents the one or more paths of a query (e.g., represents the XPath or the XPaths of an XQuery For Let Where Return (FLWR) expression). The FOR refers to each document node selected by a location path. The LET refers to a new variable that has a specified value. The WHERE refers to a condition expressed in a path that is true. The RETURN refers to a node set.

Figure 2B:
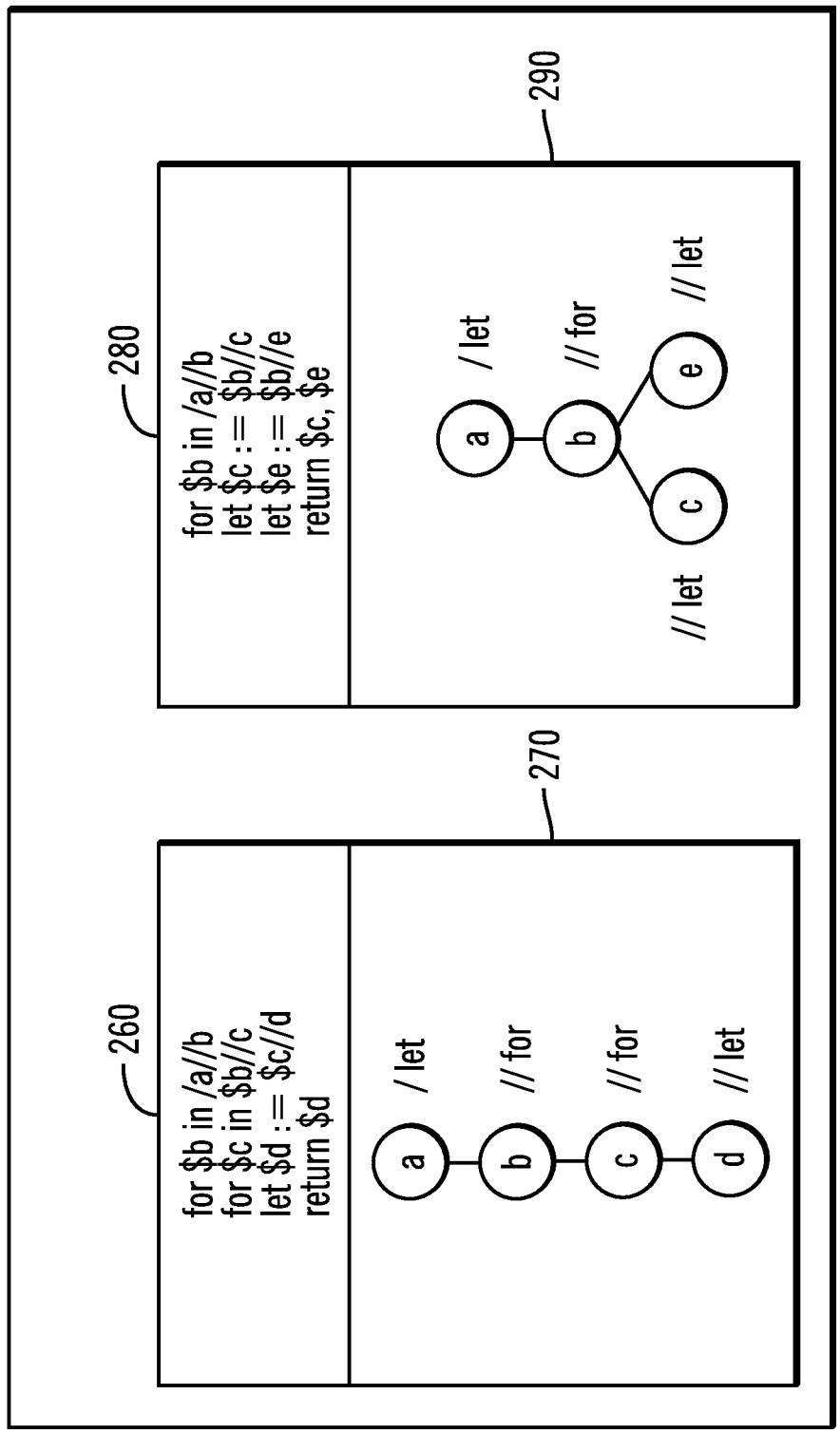
FIG. 2B illustrates FOR-LET query structures in accordance with certain embodiments.

The query structure is made up of query nodes. FIG. 2B illustrates FOR-LET query structures in accordance with certain embodiments. In FIG. 2B, query 260 is represented by query structure 270. In query 260, the $ preceding a letter indicates that the $<letter> combination represents one or more steps. For example, $b//c is equivalent to /a//b//c; that is, $b is replaced by /a//b. Query structure 270 represents query 260 and includes for and let flags. Similarly, query 280 is represented by query structure 290.

When traversing the document nodes of a hierarchical document using depth first traversal, the first time a document node is encountered, that document node is a start event for that document node. For example, if a hierarchical document has multiple <b> document nodes, the first time a first <b> document node is encountered, that first <b> document node is a start event for <b> document nodes. As another example, if an XML document is being streamed using Simple API for XML (SAX), startDocument and startElement events are start events. SAX may be described as an Application Program Interface (API) that enables interpretation of an XML document. For example, in FIG. 2A, the <a> document node is a start event.

When all the descendants of a document node have been visited during depth first traversal, the last document node encountered is an end event for that document node. For example, in FIG. 2A, the </c> document node is an end event. As another example, an XML document is being streamed using SAX, endDocument and endElement events are end events.

Given a query (e.g., an XPath or the XPaths of an XQuery FLWR expression) and a hierarchical document (e.g., an XML document), the query processor 130 attempts to find step instances (i.e. document nodes in the hierarchical document) that are described by the steps of the one or more paths in the query. The query processor 130 stores which steps are being processed, processes start events and end events, and stores which step instances have been found so far. The query processor 130 constructs a LookingFor structure to store the information. After examining a portion of the hierarchical document, the query processor 130 constructs information about the Step Instance Ancestor Paths (SInAPs) of the step instances that have been found. The query processor 130 stores the step instances and the SInAPs in extraction entry structures. Using information in the extraction entries, the query processor 130 constructs tuples of sequences that form the results of the query.

While processing start and end events, the query processor 130 records information in a LookingFor structure 140 about (1) which one or more steps in the path the query processor 130 is currently trying to process and (2) the step instances in the hierarchical document that the query processor 130 has found so far that are described by the one or more steps. Thus, a LookingFor structure 140 may be described as a structure that stores information about steps of a query along with information about document nodes of a hierarchical document that are described by the steps of a path.

FIG. 3 illustrates a LookingFor node 300 in a LookingFor structure in accordance with certain embodiments. The LookingFor node 300 records: a next step that is to be performed in subsequent start events as a tag field 302, a minimum or absolute level required of the next step instance as a level field 304 (e.g., for query 240, for //b, the minimum level is 3 (i.e., higher levels may be searched), and if the query included /b, the absolute level would be 3 (i.e., only level 3 would be searched), a level of the end event that the query processor 130 is looking for next in the level field 304, a parent SIID of the next step instance 306, and, if a match is found, a matching SIID 308.

The first three fields 302, 304, 306 are initialized with information about what to look for next so that the LookingFor structure is one path step ahead (e.g., for query 240, if the query processor is processing //b at level 3 and a <b> node is found, the LookingFor structure is updated, and the LookingFor structure is updated to identify the next step that is to be processed). This is done because the query processor 130 needs to know what to look for in the hierarchical document before processing the next start event. As the query processor 130 processes start events, more than one LookingFor node in the LookingFor structure may be described by a step. When the query processor 130 finds a document node described by the extraction step of a path (i.e., a step instance is found), the query processor 130 updates the LookingFor structure and uses information in the LookingFor structure to construct the SInAP for that extraction step, which a step instance.

Figure 4:
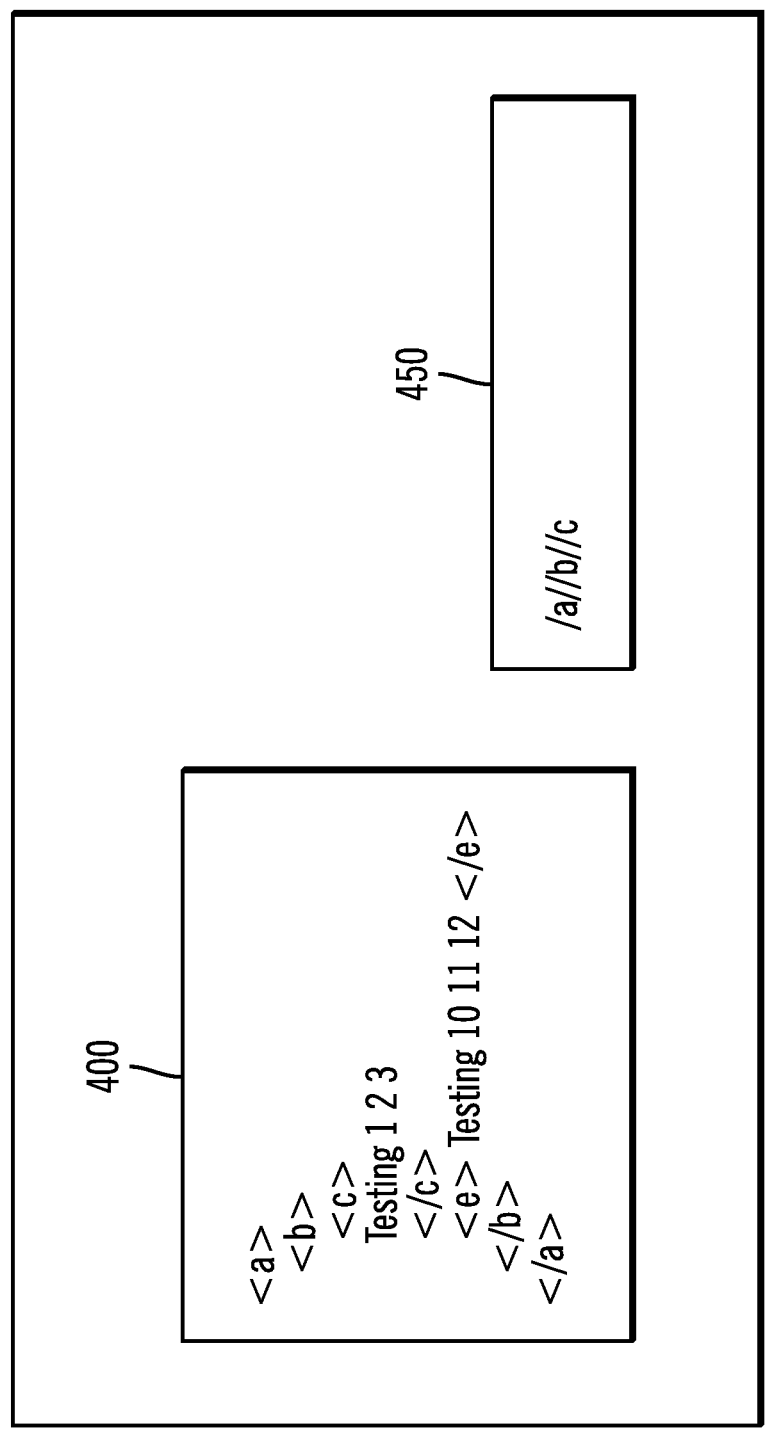
FIG. 4 illustrates a document and a query in accordance with certain embodiments.
Figure 5A:
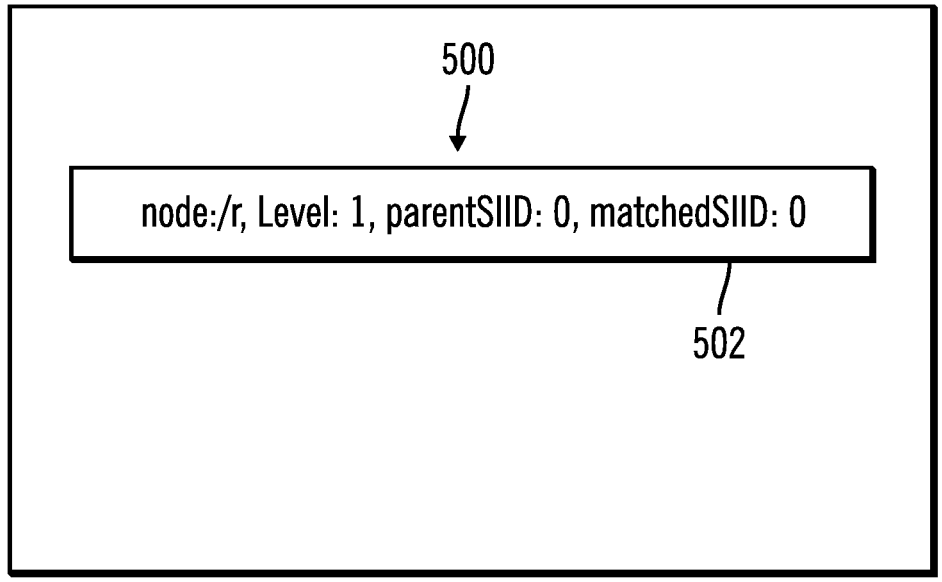
FIGS. 5A-5F illustrate a changing LookingFor structure in accordance with certain embodiments.

FIG. 4 illustrates a hierarchical document 400 and a query 450 in accordance with certain embodiments. For the hierarchical document 400 and query 450, FIGS. 5A-5F illustrate a changing LookingFor structure 500 in accordance with certain embodiments. In FIG. 5A, the LookingFor node 502 indicates that the query processor 130 is looking for a root document node of the hierarchical document 400. In particular, the LookingFor node 502 indicates "/r" for the step that describes the root document node and a child axis and indicates 1 for the level on which the query processor 130 searches for the root document node. The parent SIID is set to 0 because the root document node does not have a parent. Also, at this time, there are no matching SIIDs, so the Matched SIID is set to 0.

Figure 5B:
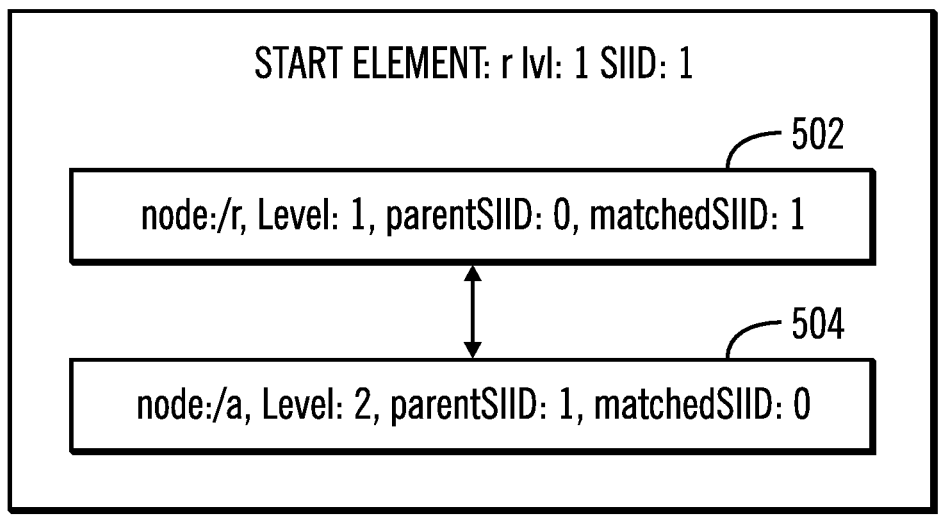

In FIG. 5B, the start event is set to the root document node at level 1. After the query processor 130 gets the start event of the root document node and associates that with the LookingFor node 502 in the LookingFor structure, the query processor 130 adds a next LookingFor node 504 to the LookingFor structure in FIG. 5B. The LookingFor node 504 indicates that the <a> document node described by the "/a" step is the next document node that the query processor 130 is looking for at level 2 on a child axis. That is, now the query processor 130 is looking for a document node that is a child of the root document node of the hierarchical document 400, that is at level 2, and that is described by the "/a" step. The query processor 130 records the SIID of the root document node, which is 1, in the LookingFor node 504 parentSIID field. If the query processor 130 subsequently finds an <a> document node in the hierarchical document 400, then the parentSIID value reflects that the <a> document node ancestor step instance (i.e., the root) has SIID 1.

Figure 5C:
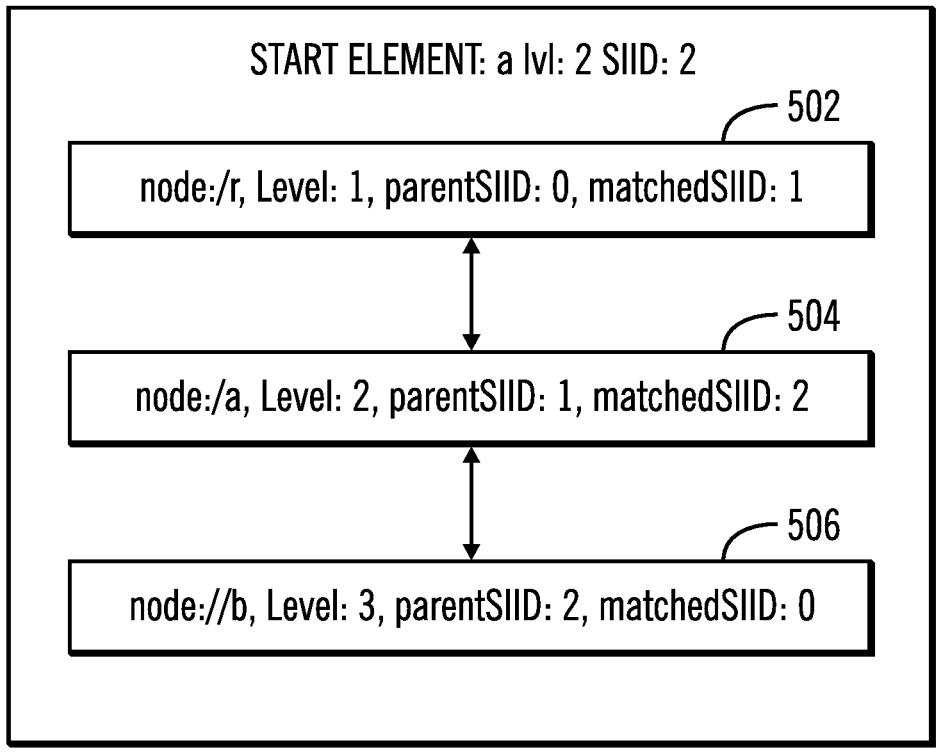

The query processor 130 continues to process the start events. In FIG. 5C, the start event is set to the <a> document node at level 2. When the query processor 130 finds the first <a> document node in the hierarchical document 400 described by the "/a" step, the query processor 130 updates the LookingFor node 504 to show that the Matched SIID is 2 and adds a LookingFor node 506 in FIG. 5C. The LookingFor node 506 indicates that the query processor 130 is looking for a <b> document node described by the "//b" step at level 3 on a descendants axis, and, if the query processor 130 finds a <b> document node described by the "//b" step, the parentSIID will be 2 in the LookingFor node 506. Note that because the axis for the "//b" step of query 450 specifies any descendant <b> document node, a level of 3 in the LookingFor node 506 entry indicates that the minimum level that a <b> document node can be found that is described by the "//b" step is at level 3. So a <b> document node at level 4 will also be described by the "//b" step of query 450.

Figure 5D:
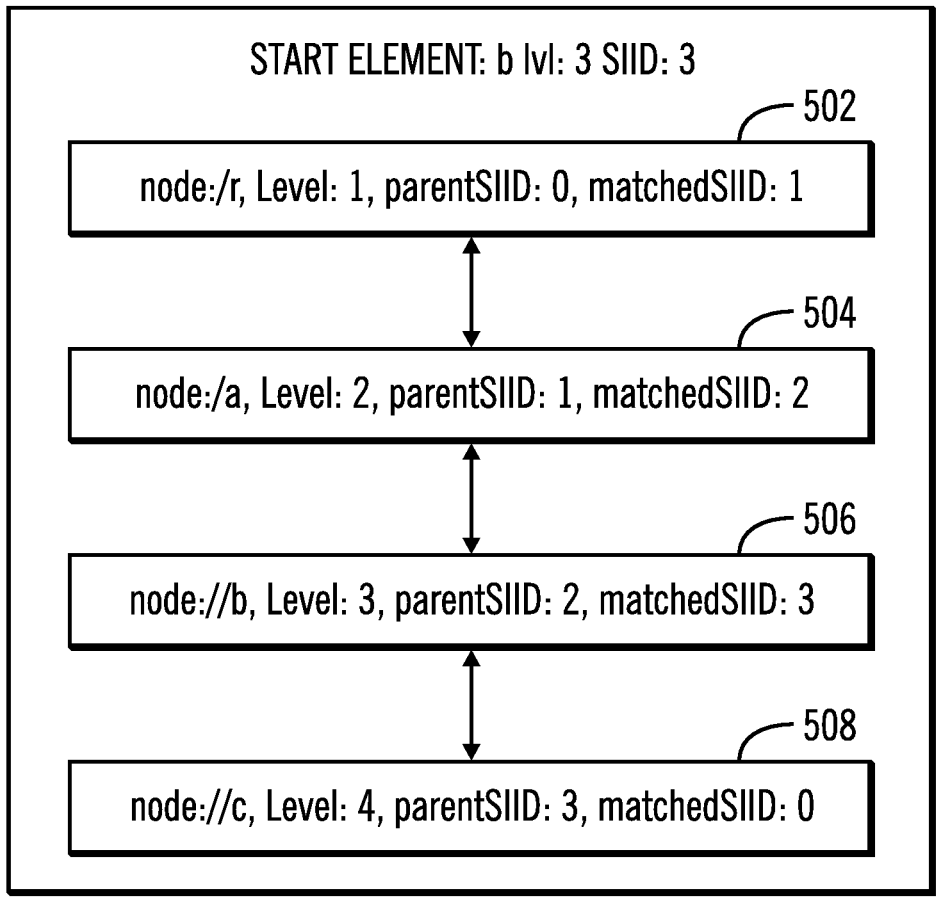

In FIG. 5D, the start event is set to the <b> document node at level 3. When the query processor 130 finds the <b> document node described by the "//b" step, the query processor 130 updates the LookingFor node 506 to show that the Matched SIID is 3 and adds a LookingFor node 508 in FIG. 5D. The LookingFor node 508 indicates that the query processor 130 is now looking for a <c> document node described by the "//c" step at level 4 on a descendants axis. At this point, the query processor 130 is looking for <b> document nodes at any level greater than level 3, and the query processor 130 is looking for <c> document nodes at any level greater than or equal to level 4.

LookingFor nodes not only represent which steps the query processor 130 is processing (i.e., which document nodes the query processor 130 is looking for), but also which end events the query processor 130 is looking for. In FIG. 5C, for example, the query processor 130 is also looking for the end event for the <a> document node that has been found. The last LookingFor node represents this by having a level higher than the end event level for the document node for which the end event is being sought. For example, the LookingFor node 506 in FIG. 5C has a level of 3, which is higher than the level of 2 associated with the <a> document node in the LookingFor node 504. As another example, in FIG. 5D, the query processor 130 is also looking for the end event for the <b> document node that has been found. The last LookingFor node 508 represents this by having a level of 4, which is higher than the end event level for the <b> document node.

Figure 5E:
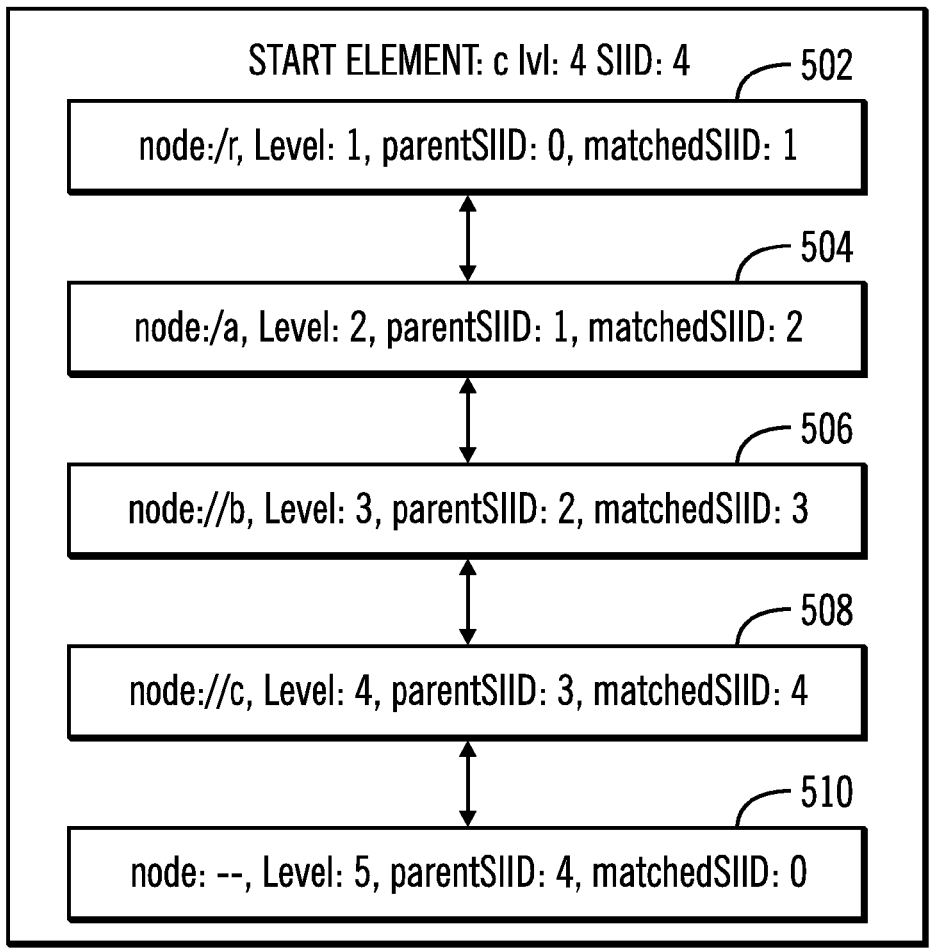

In FIG. 5E, the start event is set to the <c> document node at level 4. When the query processor 130 finds the <c> document node described by the "//c" step at level 4 in FIG. 5E, the query processor 130 updates the LookingFor node 508 to show that the Matched SIID is 4 and adds a LookingFor node 510. The LookingFor node 510 indicates that the query processor 130 is looking for the end event for <c>. In particular, the LookingFor node 510 uses "- -" in place of a step to indicate that the query processor 130 is not looking for a new document node.

Figure 5F:
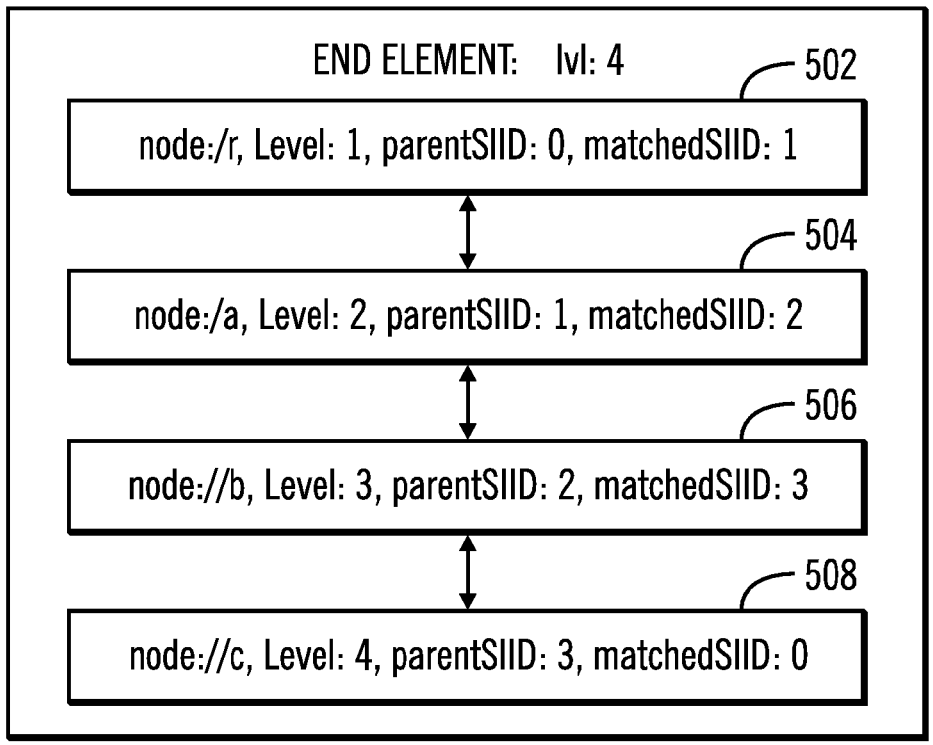

In FIG. 5F, the end element is set to level 4. When the query processor 130 gets the end event for the <c> document node in FIG. 5F, the query processor 130 removes the last LookingFor node 510 with a level greater than the end events level, which is level 4.

From the LookingFor structure 140, the query processor 130 constructs Step Instance Ancestor Path (SInAP). A SInAP may also be described as document node ancestor paths for document nodes of a hierarchical document.

As the query processor 130 processes extraction steps in the query 450, the query processor 130 stores the step instances that are described by steps of the query and constructs their SInAPs. In FIG. 5E, the <c> document node is described with an extraction step ("//c") in query 450. Because this is for an extraction step, the query processor 130 constructs the SInAP for the <c> document node. The query processor 130 does this by traversing the LookingFor structure bottom up, starting from the last LookingFor node added and continuing up to the root of the LookingFor structure. During the traversal, the query processor 130 propagates up the parent SIID information.

Figure 6:
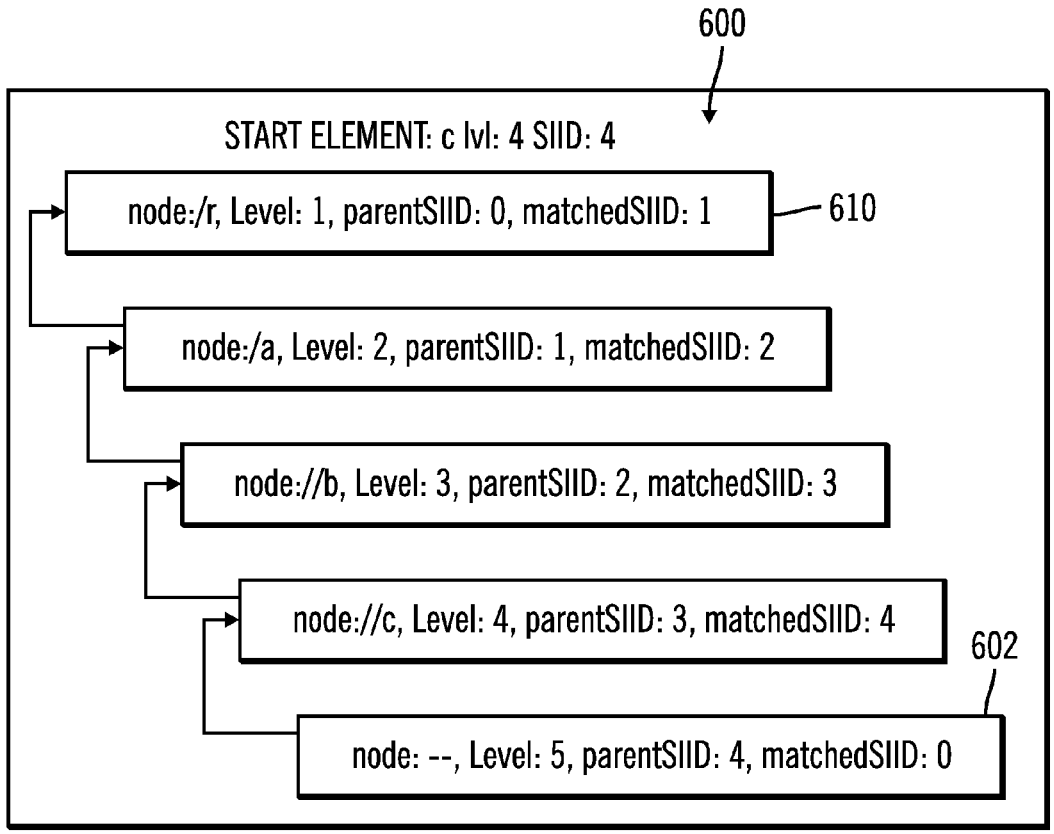
FIG. 6 illustrates construction of a Step Instance Ancestor Path (SInAP) in accordance with certain embodiments.
Figure 7:
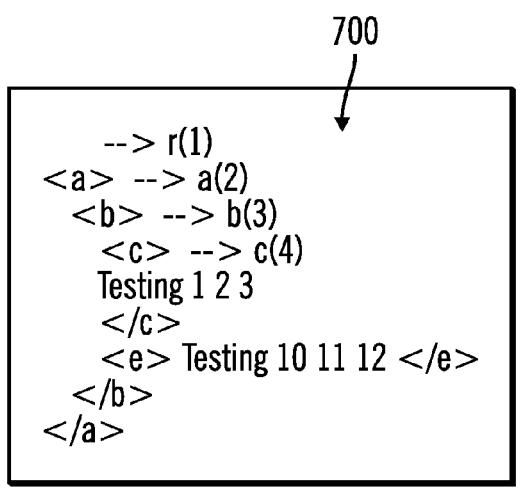
FIG. 7 illustrates document nodes associated with a SInAP in accordance with certain embodiments.

FIG. 6 illustrates construction of a SInAP in accordance with certain embodiments. In FIG. 6, the query processor 130 traverses the LookingFor structure 600 from LookingFor node 602 up to the LookingFor node 610, which is the root LookingFor node in the LookingFor structure 600. With the traversal, the query processor 130 retrieves the following parentSIIDs: "r(1), a(2), b(3), c(4)", and this sequence of parentSIIDs is the SInAP for the <c> step instance. FIG. 7 illustrates document nodes 700 associated with a SInAP in accordance with certain embodiments. In FIG. 7, the document nodes 700 correspond to the "r(1), a(2), b(3), c(4)" SInAP.

Because LookingFor nodes in the LookingFor structure are reused during end events, such as the LookingFor nodes illustrated in FIG. 5F, the query processor 130 uses an extraction entry to record the step instance and the associated SInAP. FIG. 8 illustrates an extraction entry structure 800 in accordance with certain embodiments. Each extraction entry includes a step instance match candidate field and a step instance ancestor path field. The step instance match candidate field records an SIID of a matched step instance, while the step instance ancestor path field records the SInAP of the matched step instance.

FIG. 9 illustrates an extraction entry 900 in accordance with certain embodiments. In FIG. 9, for extraction entry 900, the step instance match candidate is "c(4)", and the step instance ancestor path is "r(1), a(2), b(3), c(4)".

In certain embodiments, extraction entries are buffered as intermediate results. This is because the document nodes represented in extraction entries may be in a path in which path step predicates still need to be evaluated. Also, extraction entries are buffered so that the query processor 130 is able to return final results in document order, with duplicate entries removed.

Thus, embodiments construct ancestor/descendant paths by using LookingFor structures to store information about document nodes described by steps of a query for which the query processor 130 is searching as well document nodes that have been found. Embodiments provide path matching of multiple start and end events. Embodiments treat both start and end events as a same class of events to respond and match with entries in a LookingFor structure. Embodiments maintain ancestor and descendant information in LookingFor structures that may then be used to form ancestor and descendant path information for document nodes of a hierarchical document. This saves storage space (e.g., memory) by tracking different events using the same structures and provides for savings in runtime. Runtime may be described as the period during which the query processor 130 evaluates a query.

Tuple Construction for a Query

Embodiments build final results for a query with reference to a hierarchical document based on constructing tuples using extraction entries. Thus, embodiments take the intermediate results created during traversal of document nodes and the traversed document nodes that are described by steps of a query, and use SInAP information to construct tuples of sequences. Tuple construction may be described as a process of associating step instance match candidates from different extraction entries in order to create a tuple of sequences.

Embodiments precompute information from a query structure to determine which step instance match candidates are to be paired, in which order they are to be paired to form tuples, and which ancestors should be compared for each pair.

A query may include multiple paths resulting in multiple extractions. Each extraction takes its items from a different list of extraction entries. Extraction entries from different lists are paired up such that they share some common SInAP.

Figure 10:
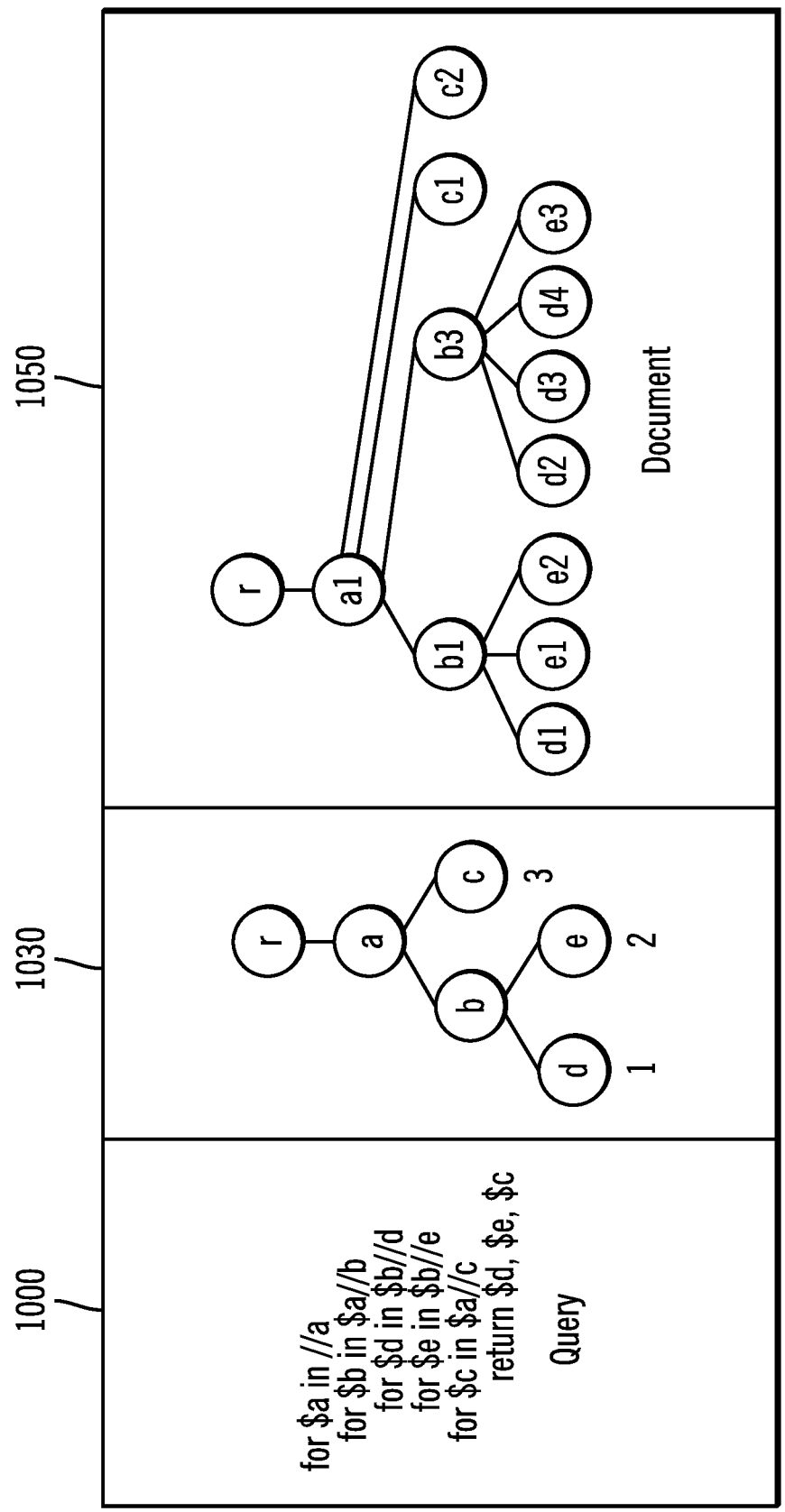
FIG. 10 illustrates a query, a query structure, and a document represented by a tree structure in accordance with certain embodiments.

FIG. 10 illustrates a query 1000, a query structure 1030, and a hierarchical document represented by a tree structure 1050 in accordance with certain embodiments. In this example, the query processor 100 pairs extraction entries in binding order. Binding order may be described as an order of nested query nodes flagged with FOR bindings in a query. The query 1000 requests a return of tuples formed by <d>, <e>, and <c> document nodes. In particular, the tuple is to include <d> and <e> document nodes descending from a <b> document node that is descending from an <a> document node, as well as a <c> document node descending from the <a> document node. Thus, there are three extractions for each result: <d>, <e>, and <c> document nodes. In FIG. 10, the query 1000 has three variables ("d", "e", and "c"), which are described with the FOR bindings. A FOR binding indicates that nodes in a set of nodes to be returned are returned one at a time (unlike a LET binding for which the set of nodes is returned together with duplicates removed).

The query processor 130 generates the requested results using extraction entries. For this example, extraction entries are as follows:

1. the extraction entries for the <d> document nodes are step instance match candidates of: d1, d2, d3, d4
2. the extraction entries for the <e> document nodes are step instance match candidates of: e1, e2, e3; and
3. the extraction entries for the <c> document nodes are step instance match candidates of: c1, c2.

To construct the results for query 1100, the query processor 130 examines the extraction entries for the <d> document nodes and the extraction entries for the <e> document nodes and attempts to find pairings of d and e step instance match candidates. Once a pairing is established, the query processor 130 examines the extraction entries for the <c> document nodes and attempts to find pairings of e and c step instance match candidates.

The query processor 130 recognizes that the "d" and "e" query nodes have a common ancestor in the "b" query node, which can be seen, for example, by examining the query structure 1030. The query processor 130 treats the "b" query node as a Nearest Common FOR Ancestor (NCFA) for the pair of "d" and "e" query nodes. Then, using extraction entries for the <d> and <e> document nodes, the query processor 130 identifies d and e step instance match candidates that have a <b> document node (e.g., <b1> or <b3>) that is a Nearest Common FOR Ancestor for the <d> and <e> document nodes. FIG. 10 illustrates a hierarchical document 1000 and a query 1050 with a predicate in accordance with certain embodiments. For example, in FIG. 10, the <d1> and <e1> document nodes have a common <b1> document node, which can be seen in the SInAPs of the extraction entries for the <d1> and <e1> document nodes (not shown). Therefore, the query processor 130 pairs the <d1> and <e1> document nodes (which are also known as step instance match candidates) to form a portion of a tuple.

Next, the query processor 130 recognizes that the "e" and "c" query nodes have a common ancestor in the "a" query node, which can be seen, for example, by examining the query structure 1030. The query processor 130 treats the "a" query node as a Nearest Common FOR Ancestor (NCFA) for the pair of "c" and "e" query nodes. Then, using extraction entries for the <c> document node, the query processor 130 pairs a c step instance match candidate with the e1 step instance candidate that has just been paired with the d1 step instance candidate. In particular, the query processor 130 pairs the c1 and e1 step instance candidates. Thus, the query processor 130 constructs the first result: d1, e1, c1.

Because the binding order is FOR every <d>, FOR every <e>, FOR every <c>, the query processor 130 advances to the c2 step instance match candidate after forming a tuple using the c1 step instance match candidate. The query processor finds that the c2 step instance match candidate pairs with the existing e1 step instance match candidate and constructs the second result: d1, e1, c2.

At this point, there are no more c step instance match candidates in the extraction entries for the <c> document node, so the query processor goes back to the c1 step instance match candidate and determines whether the e2 step instance matching candidate may be paired with the c1 step instance matching candidate and with the d1 step instance match candidate. In this example, because the <e2> and <d1> document nodes have the NCFA of the <b1> document node, the query processor 130 is able to pair the d1 and e1 step instance match candidates. Additionally, because the <c1> and <e2> nodes have a NFCA of the <a1> document node, the query processor 130 pairs the c1 and e2 step instance match candidates. Thus, the query processor 130 constructs the third result: d1, e2, c1.

Similarly, the query processor 130 constructs the fourth result: d1, e2, c2.

Now, when the query processor 130 tries to advance to e3, the query processor 130 notices that the NCFA for the <d1> and <e3> document nodes does not match because the <d1> document node NCFA is <b1>, but the <e3> document node NCFA is <b3>. Next, the query processor 130 advances the d1 step instance match candidate to the d2 step instance match candidate, which matches the e3 step instance match candidate at the <b3> document node and constructs the fifth result: d2, e3, c1.

Continuing with this processing, for the document 1350, the query processor 130 uses the extraction entries for the <c>, <d>, and <e> document nodes to construct the following results, which form a portion of the results of processing the query 1300:
1. d1, e1, c1
2. d1, e1, c2
3. d1, e2, c1
4. d1, e2, c2
5. d2, e3, c1
]6. d2, e3, c2
7. d3, e3, c1
etc.

Figure 11:
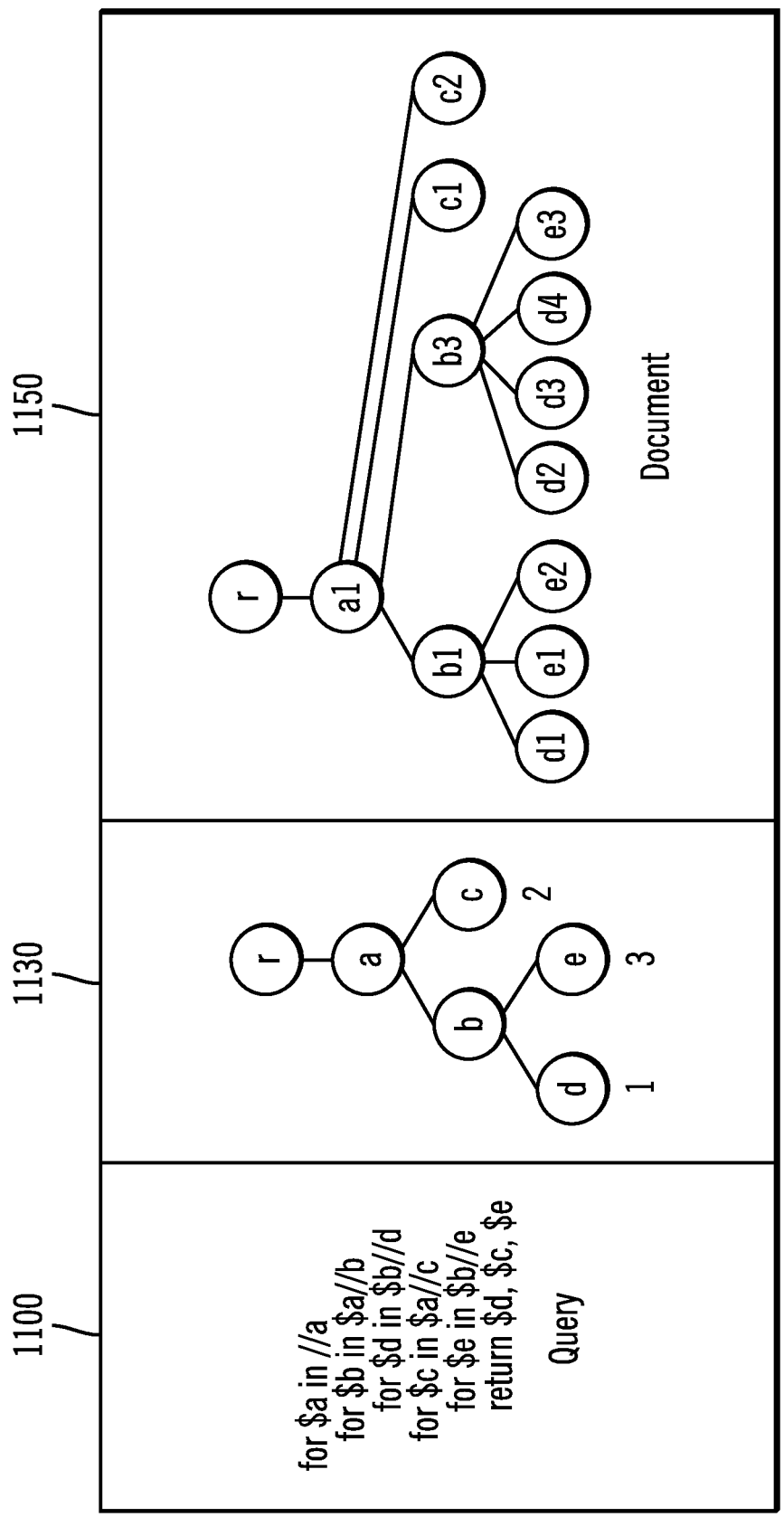
FIG. 11 illustrates query, a query structure, and a document represented by a tree structure with a modified binding order in accordance with certain embodiments.

FIG. 11 illustrates query 1100, a query structure 1130, and a hierarchical document represented by a tree structure 1150 with a modified binding order in accordance with certain embodiments. The modified binding order is FOR every <d>, FOR every <c>, FOR every <e>. With the binding order changed, the query processor 130 pairs step instance match candidates of extraction entries based on deepest NCFA, rather than binding order with NCFA. Thus, the query processor 130 uses the deepest NCFA. The Deepest NCFA may be described as a nearest common FOR ancestor that is deeper in a query structure (i.e., farther from the root node of the query structure) than other common FOR ancestors. When the query processor 130 tries to find pairings in binding order, the query processor constructs the following results:
1. d1, c1 (pair d1 and c1 at a1 are paired), e1 (e1 and c1 at a1 are paired)
2. d1, c1, e2 (e2 and c1 at a1 are paired)
3. d1, c1, e3 (e3 and c1 at a1 are paired)

By using the NFCA, the query processor 130 has an incorrect third result because the "e" query node and "d" query node should be under the same "b" query node, which can be seen from the query structure 1130. However, the <e3> document node is under a different <b> document node than the <d1> document node.

Thus, embodiments use a deepest NCFA. The query processor 130 pairs the e3 step instance match candidate with the d1 step instance match candidate. Then, the query processor 130 determines that there is no matching NCFA (i.e., b1 does not match b3) and advances to the c2 step instance match candidate.

Thus, the query processor 130 does not follow binding order when pairing. Instead, after the first pairing of the first two document nodes of the first result, which may be in binding order, when doing subsequent pairings, the query processor 130 pairs the new step instance match candidate with one of the step instance match candidates already paired that has a deepest NCFA. For example, the NCFA for the "e" and "c" query nodes is the "a" query node, and the "a" query node is at level 2 in the query structure 1130. Also, the NCFA for the "e" and "d" query nodes is the "b" query node, and the "b" query node is at level 3 in the query structure 1130. Thus, the "b" query node is the deepest NCFA among the possible pairings. So the query processor 130 pairs step instance match candidates in the extraction entries in for the <e> document nodes with step instance match candidates in the extraction entries for the <d> document nodes. In certain embodiments, the deepest NCFA is bound to a query node flagged with a FOR binding. If the deepest NCFA is bound to a query node flagged with a LET binding, the query processor 130 finds the ancestor of that deepest NCFA that is a query node flagged with a FOR binding and makes that the deepest NCFA. If there are no ancestors of the query node flagged with a FOR binding other than the root query node, the query processor 130 uses the root query node as the deepest NCFA.

Thus, embodiments analyze the query structure prior to evaluation and compute the deepest NCFAs. The query processor 130 then predetermines which pairings to perform during runtime. In the example above, the query processor 130 predetermine that <d> document nodes and <c> document nodes are to be paired, and then that <d> document nodes are to be paired with <e> document nodes when constructing results. Further, the query processor is able to predetermine that the <d> and <c> document node pairings should match at an <a> document node, and that the <d> and <e> document node pairing should match at a <b> document node. Embodiments are efficient in that one ancestor per tuple entry is compared. These precomputations save computation time during runtime.

Embodiments provide improvements over conventional techniques that compute for intersections of ancestor sets when building tuples. For example, for a query /a/b/c, /a/b/d, /a/b/e, meaning, find all the <b> document nodes, <c> document nodes, and <d> document nodes under the same <a> document node, and the same <b> document node. In this case, the query processor 130 gather the set of <c> document nodes, the set of <d> document nodes and the set of <e> document nodes, under some <a> and <b> document nodes. To find which <c> document nodes and which <d> document nodes and which <e> document nodes go together, however, the conventional techniques suggest taking the ancestors for one <c> document node, and making sure that its ancestors intersect with that for a <d> document node. So, with conventional techniques, if a <c1> document node has a <a1> document node and a <b1> document node as an ancestor, then the <d1> should have the <a1> document node and the <b1> document node as an ancestor too. With embodiments, the query processor 130 determines that the <c> document nodes and the <d> document nodes only have to have a common <b> document node, thus avoiding a check for all ancestors.

Flush Point Analysis to Manage Lifetimes of Intermediate Results

When evaluating a query for a hierarchical document, the query processor 130 does not examine the entire hierarchical document before returning a portion of the results. Instead, results may be pipelined (i.e., as the hierarchical document is being processed, some results may be returned). Further, when evaluating the query over a hierarchical document in document order, the query processor 130 may buffer intermediate results. Document order may be described as an order inherent in performing a depth first traversal of a hierarchical document. The query processor 130 may periodically flush (i.e., discard) the intermediate results after retuning results based on those intermediate results and before all results are available, while making sure the query may be answered without the flushed intermediate results.

The query processor 130 precomputes the lifetime of the intermediate buffers that are carrying intermediate results. The query processor 130 precomputes (i.e., determines before runtime) the lifetime based on the type of query. The query processor 130 may also extend or shorten the precomputed lifetime based on information found in the hierarchical document during query evaluation (i.e., during runtime).

Analysis made before the query evaluation and analysis made during the query evaluation determines the time when intermediate results may be discarded. Thus, the query processor 130 returns results for a query as soon as possible without having to read the entire hierarchical document to aid pipelining.

The query processor 130 defines a flush point as an earliest point in time during query evaluation that a portion of results may be returned and intermediate results may be discarded. In many cases, the query processor 130 does not examine the entire hierarchical document in order to return results.

In certain embodiments, a flush point is an earliest end event that may be used to start returning results and subsequently disregard extraction entries that are buffered. The flush point may also be the point in time to start returning results while traversing the hierarchical document, so that results appear in hierarchical document order, with duplicates removed, for a query.

Figure 12:
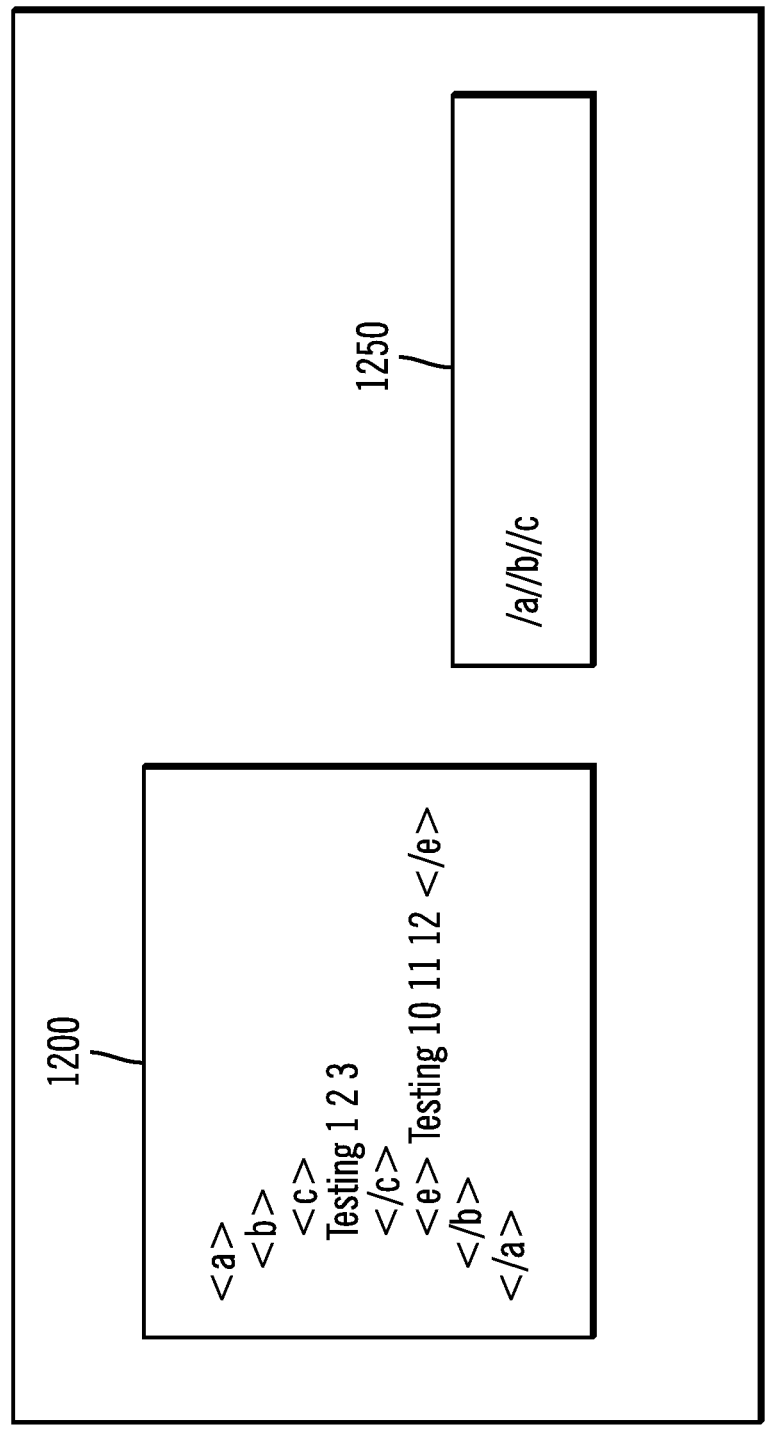
FIG. 12 illustrates a document and a query in accordance with certain embodiments.
Figure 13:
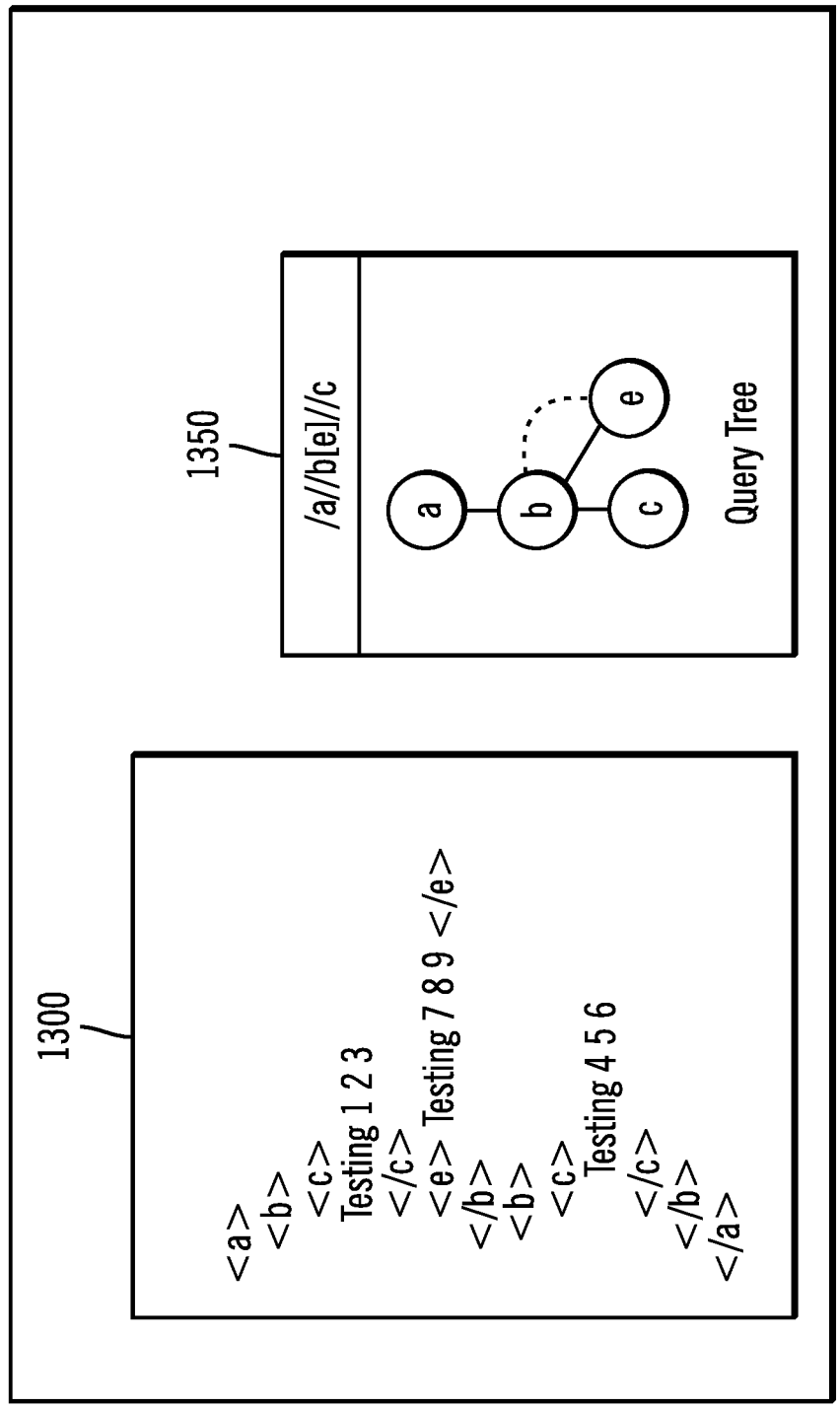
FIG. 13 illustrates a document and a query with a predicate in accordance with certain embodiments.

FIG. 12 illustrates a hierarchical document 1200 and a query 1250 in accordance with certain embodiments. When all the descendants of a document node have been visited during depth first traversal, the last document node encountered is an end event for that document node. Query 1250 requests <c> document nodes that descend from <b> document nodes that, in turn, descend from <a> document nodes. For query 1250, the flush point is at the end event of a root of the hierarchical document 1200 because the query processor 130 accumulates the sequence of an <a> document node and relevant nodes descending from the <a> document node under the root of the hierarchical document before returning results.

Query 1350 requests <c> document nodes that descend from <b> document nodes, that, in turn, descend from <a> document nodes, but where the <b> document nodes include descendant <e> document nodes. For query 1350, the flush point is also the end event of a root of the hierarchical document 1300 as the query processor 130 accumulates each of the <b> document nodes that has an <e> document node as a descendant and then gets the <c> document node descending from each of these <b> document nodes.

Figure 14:
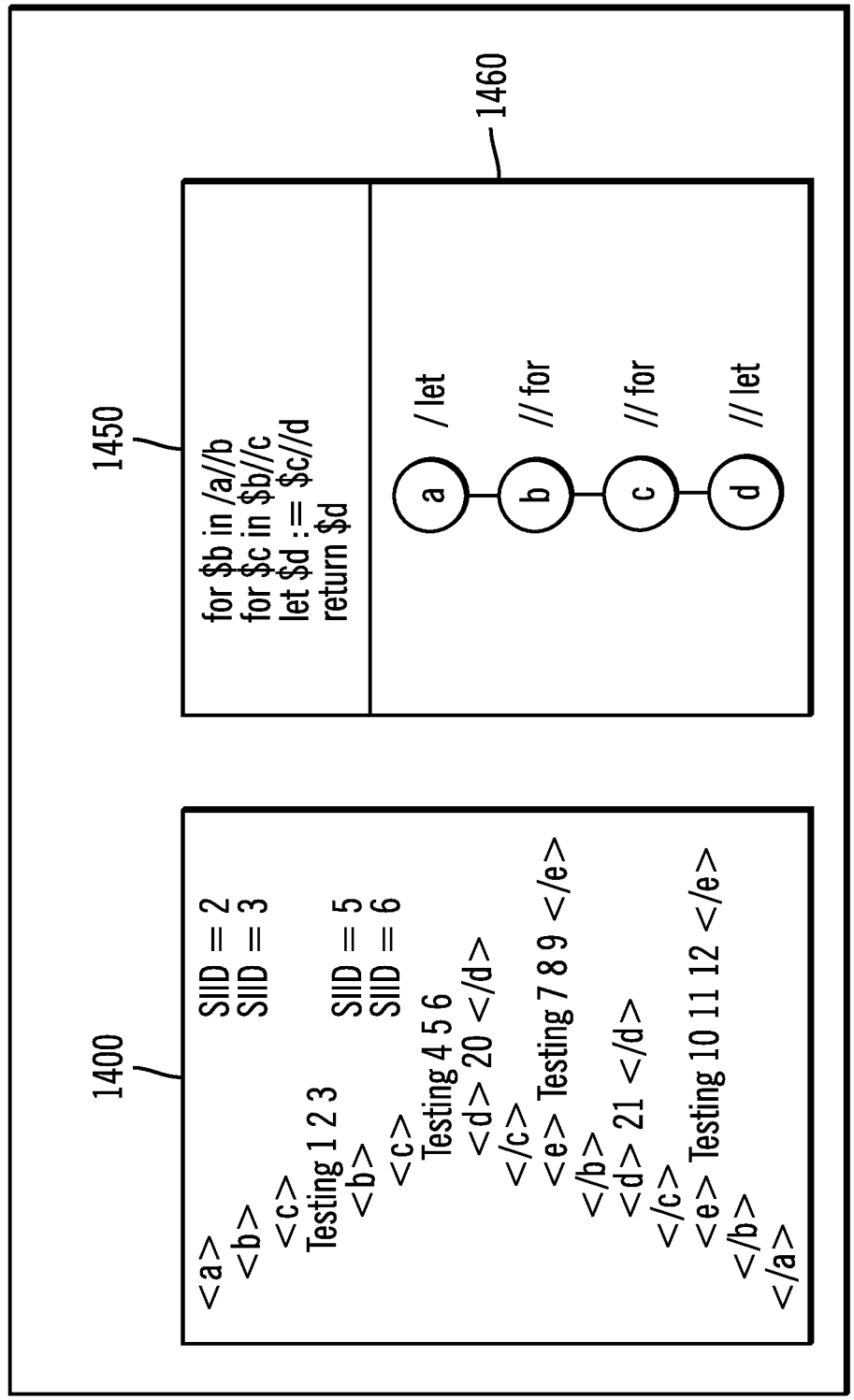
FIG. 14 illustrates a document with recursive nodes and a query in accordance with certain embodiments.

FIG. 14 illustrates a hierarchical document 1400 with recursive nodes and a query 1450 in accordance with certain embodiments. A recursive case may be described as one in which a query uses a descendant axis in one or more steps and in which such a query is applied to a hierarchical document that includes recursive nodes that are identical and have ancestor, descendant relationships. A hierarchical document that includes recursive nodes that are identical and have ancestor, descendant relationships may also be referred to as recursive hierarchical document. For example, with reference to FIG. 14, query 1450 includes step //b, while the hierarchical document 1400 includes a <b> node nested below another <b> node, therefore, this query 1450 and this hierarchical document 1400 form a recursive case.

Query 1450 requests return of <d> document nodes that descend from <c> document nodes that descend from <b> document nodes that, in turn, descend from <a> document nodes. For query 1450, the query processor 130 first sets the flush point to the end event of the <c> document node because this is when a complete sequence of <d> document nodes may be accumulated for each <c> document node. If there are recursive nodes detected during traversal that are described by any of the query nodes in the query structure 1460 with FOR bindings while using a descendant axis, the query processor 130 sets the outermost recursive node to be a new flush point. In query 1450, the flush point is changed to the outermost <b> document node from the <c> document node. The query processor 130 does this to delay returning results until the end event of the first <b> document node at which point the query processor 130 is able to generate the correct sequence of <d> document nodes for every <b> document node and for every <c> document node in document order. That is, for the first <b> document node and first <c> document node, the query processor 130 generates the sequence <d>20</d>, <d>21</d>. For the first <b> document node and second <c> document node, the query processor 130 generates the sequence <d>20</d>. For the second <b> document node and second <c> document node, the query processor 130 generates the sequence <d>20</d>.

Figure 15:
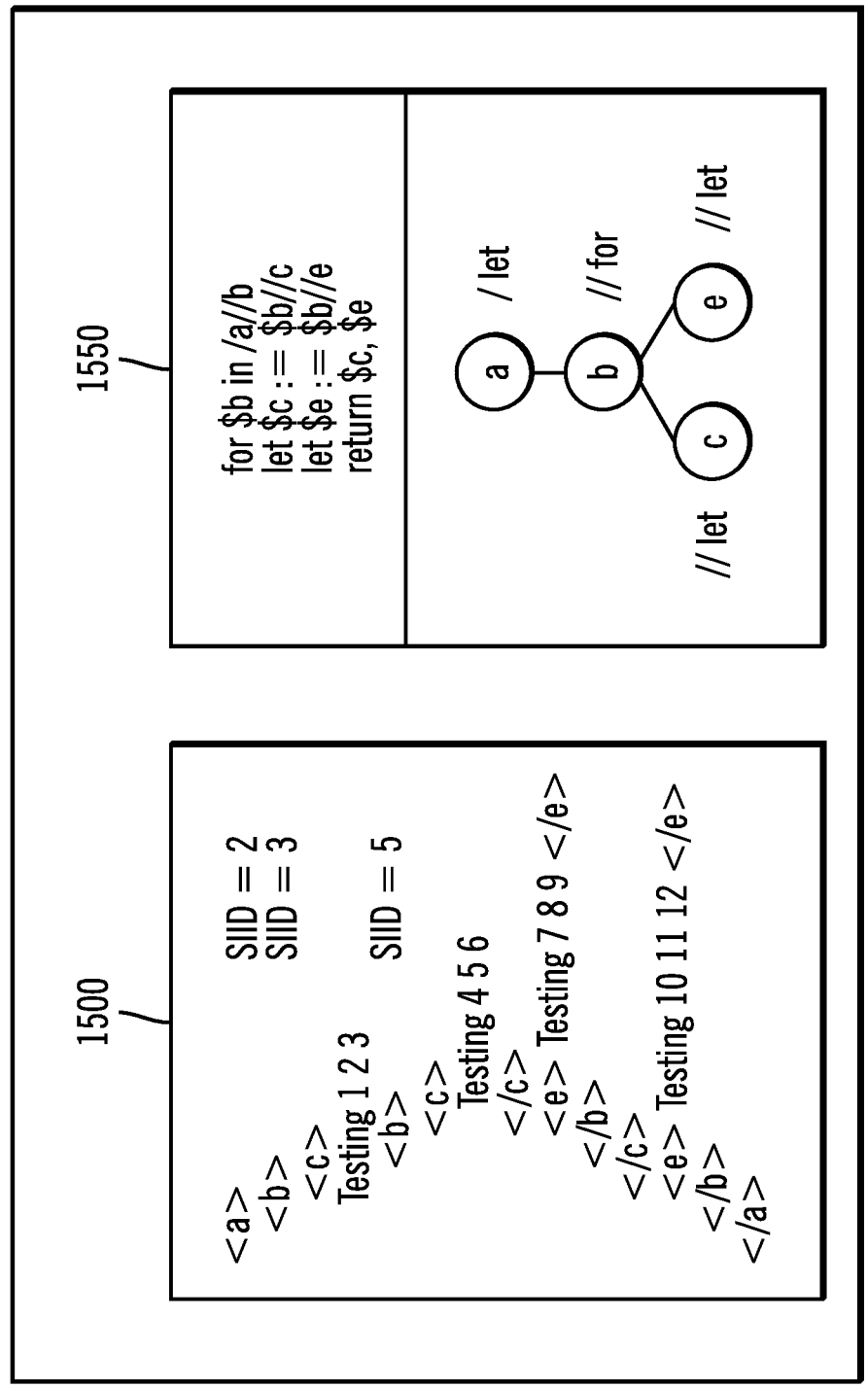
FIG. 15 illustrates a document and a query requesting descendants of a common ancestor in accordance with certain embodiments.

FIG. 15 illustrates a hierarchical document 1500 and a query 1550 requesting descendants of a common ancestor in accordance with certain embodiments. Query 1550 requests return of <c> and <e> document nodes that each descend from <b> document nodes that, in turn, descend from <a> document nodes. For query 1550, the query processor 130 sets the flush point to an outer most <b> document node so that the query processor 130 is able to accumulate the correct sequence of <c> document nodes and <e> document nodes under matching ancestor <b> document nodes. That is, for the first <b> document node, the query processor 130 has the first <c> document node and second <c> document node, and the first <e> document node and second <e> document node. For the second <b> document node, the query processor 130 has the second <c> document node and second <e> document node.

Figure 16:
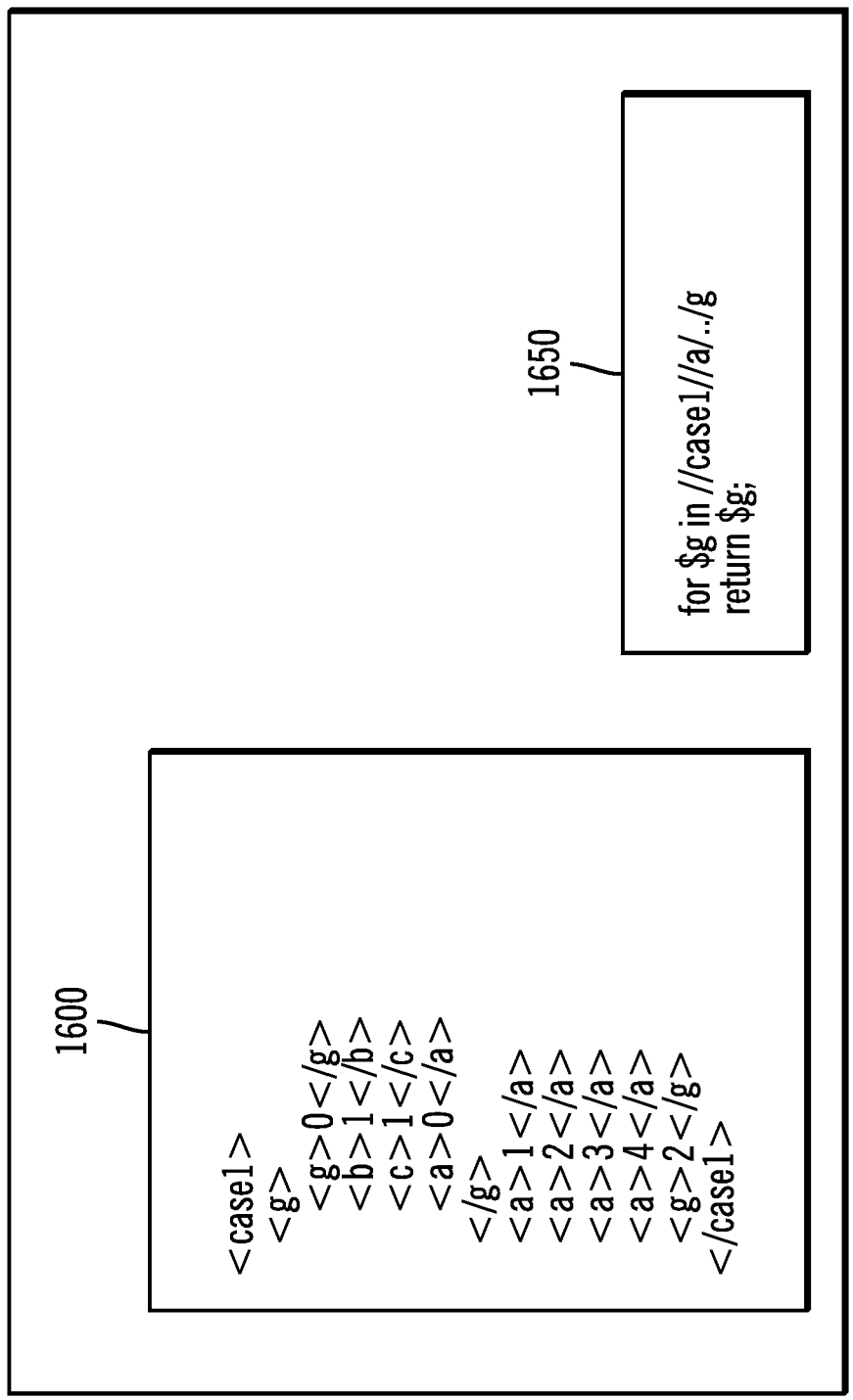
FIG. 16 illustrates a document and a query with a parent axis in accordance with certain embodiments.

FIG. 16 illustrates a hierarchical document 1600 and a query 1650 with a parent axis in accordance with certain embodiments. Query 1650 requests return of <g> document nodes that are an immediate child of the parent of <a> document nodes that, in turn, descend from <case1> document nodes. For query 1650, the query processor 130 sets the flush point to an end event of the <case1> document node. When there is a parent axis in the path (e.g., "/..") in query 1650), the query processor 130 stops traversing down the hierarchical document at the step in the path before the parent axis (e.g., "//a") and then extracts one or more parents. In this case, for each <a> document node found, the query processor 130 accumulates the parent document nodes (i.e., <case1> and <g> document nodes). The query processor 130 extracts the parent document nodes. In certain embodiments, the parent document nodes may be extracted out of document order, in which case, the query processor 130 puts the parent document nodes in document order. That is, the query processor 130 retrieves the <g> document node first and then the <case1> document node next while traversing down the hierarchical document 1600 and processing the <a>0 document node through the <a>4 document node, so the query processor 130 sorts the parent document nodes based on document order before evaluating the next step following the parent axis (e.g., "/g") for the parent document nodes. So when accumulating the parent document nodes for the <a> document node, the query processor 130 continues to do so until the query processor 130 hits the flush point. This flush point is the end event for the <case1> document node. If the query processor 130 finds a parent axis in the path of the query 1650, the query processor 130 recognizes that the parent of a step previous to the parent axis step will be extracted, so the flush point has to be the end event of the step previous to that step. In query 1650, the "//a" is previous to step "/..", which is the parent axis, so the step previous to step "//a" is step "//case1", and that is the flush point. If there are more "/.." steps, the query processor 130 continues to move the flush point higher until the query processor 130 ends up using the end event for the root of the query as the flush point.

For queries without parent axis steps, such as queries 1250, 1350, 1450, 1550, the query processor 130 identifies a query node in the query structure that is to be a flushpoint. In certain embodiments, a flush point is associated with a query node. However, the query processor sets the flush point to the end event of the step instance that is described by that query node and that will trigger the flush (i.e., returning of results). Note also that in recursive node cases, the flush point may be moved higher in the hierarchy of the hierarchical document.

To determine the flush point for a query, the query processor 130 starts from the extraction nodes of a query structure and traverses up. The query processor 130 stops when either (1) finding a query node that is flagged with the FOR binding, or, if there are no such query nodes, (2) reaching the root of the query structure. The query processor 130 flags the query node that the query processor 130 stopped at with a Flush-Candidate identifier. Then, the query processor 130 traverses from the root of the query structure downwards until the query processor 130 finds (1) a query node that is flagged with the FlushCandidate identifier or (2) finds a query node that has more than one child. The query processor 130 then flags that query node as a flush point. During document evaluation, when the query processor 130 processes end events, the query processor 130 checks whether the query processor 130 reached a flush point (i.e., a step instance is described by a step flagged as a flush point). If so, the query processor 130 returns results.

Handling Recursive Cases Using Ancestor Sets

A recursive case may be described as one in which a query uses a descendant axis in one or more steps and in which such a query is applied to a hierarchical document that includes recursive nodes that are identical, which have ancestor, descendant relationships.

The query processor 130 handles query FOR bindings and descendant axis applied to recursive hierarchical documents. Embodiments are applicable to approaches that maintain ancestor information for document nodes described by one or more steps of a query. Embodiments provide special processing when recursive FOR matches are detected.

During query processing, the query processor 130 stores document nodes that are described by steps that have FOR bindings. Whenever another document node is found that is a descendant of a previous document node described by a step with a FOR binding, the query processor 130 stores these recursive FOR matches. With ancestor based approaches, document nodes described by extraction steps that are under recursive nodes are to be identified uniquely per recursive node. Knowing this, embodiments produce correct results by producing a match for every recursive node ancestor.

Figure 17:
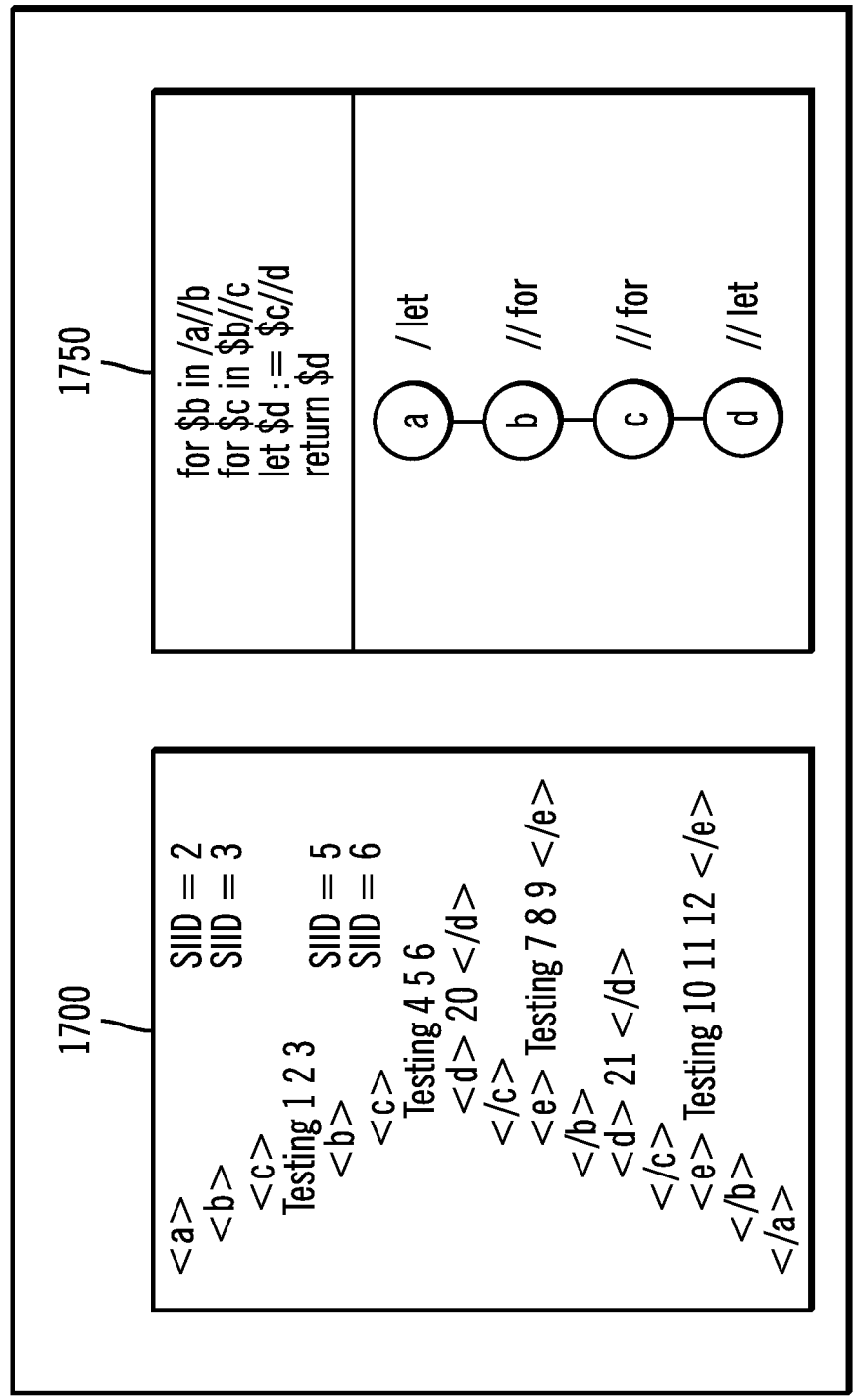
FIG. 17 illustrates a document and a query with single extraction and recursive nodes in accordance with certain embodiments.

FIG. 17 illustrates a hierarchical document 1700 and a query 1750 with single extraction and recursive nodes in accordance with certain embodiments. In the hierarchical document 1700, SIIDs relevant to this example are shown. The query structure 1750 includes "b" and "c" query nodes that are flagged with FOR bindings. Hierarchical document 1700 is recursive in that a <b> document node appears below another <b> document node. Similarly, a <c> document node appears below another <c> document node.

Figure 18:
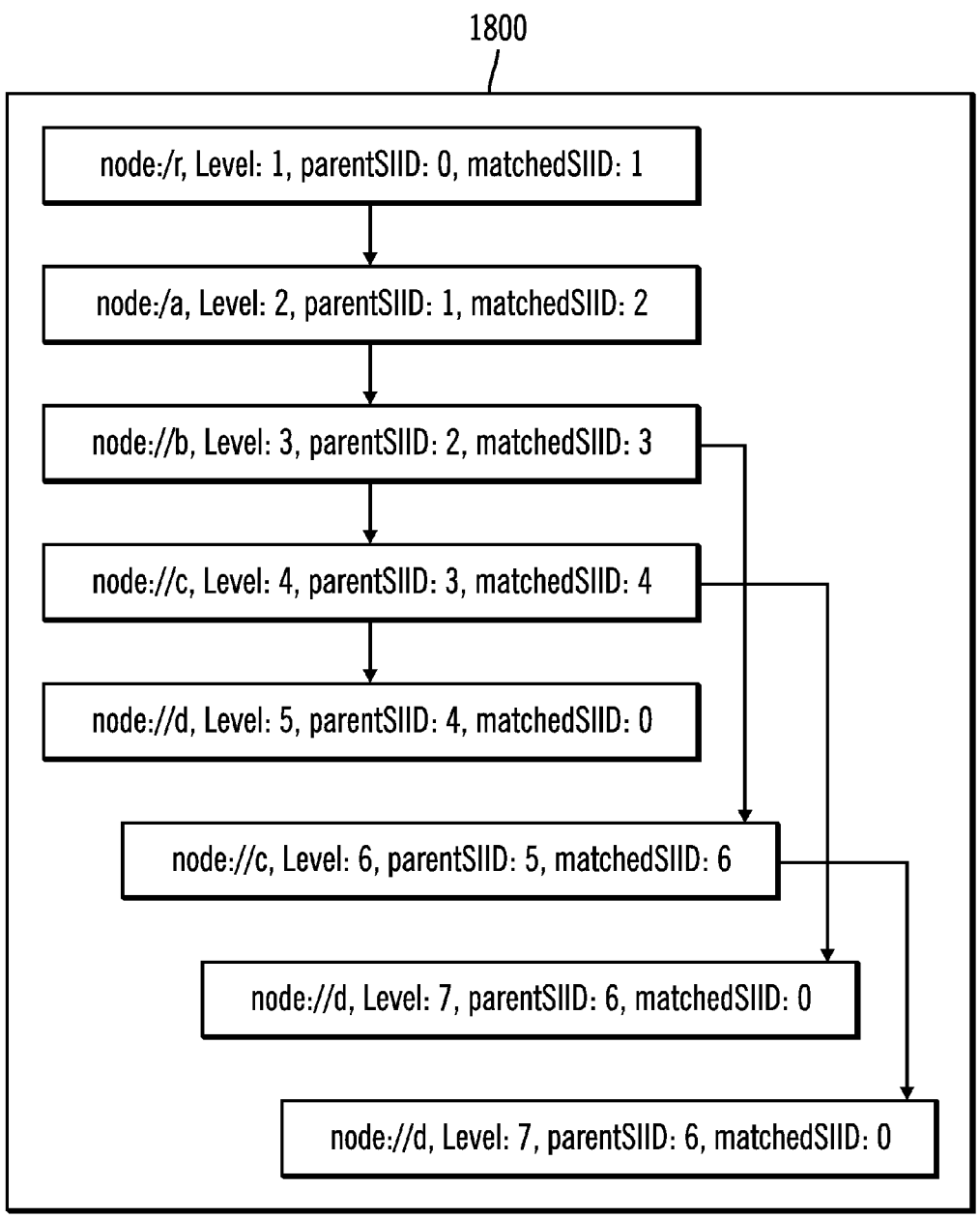
FIG. 18 illustrates a LookingFor structure with multiple branches in accordance with certain embodiments.

FIG. 18 illustrates a LookingFor structure 1800 with multiple branches in accordance with certain embodiments. In FIG. 18, the LookingFor structure 1800 is illustrated as it would be after the query processor 130 has reached the second <c> document node, which has an SIID of 6.

FIG. 19 illustrates extraction entries created for hierarchical document 1700 including recursive nodes that are described by path steps using a descendant axis in accordance with certain embodiments. If there are recursive nodes in a hierarchical document, and those recursive nodes are described by steps using a descendant axis, then, when the query processor 130 continues to traverse the hierarchical document and finds the first <d> document node described by the "//d" step, the query processor 130 creates the extraction entries 1910, 1920, 1930 for the <d> document node, which has a SIID of 7. Each of these extraction entries 1910, 1920, 1930 identify a unique step instance ancestor path for the same step instance "d(7)". For example, the first extraction entry 1910 has the SInAP "r(1), a(2), b(3), c(4), d(7)", and this SInAP represents the document nodes: (1) the root document node with SIID 1, (2) the <a> document node with SIID 2, (3) the <b> document node with SIID 3, (4) the <c> document node with SIID 4, and (5) the <d> document node with SIID 7.

A single document node in the hierarchical document (i.e., a single step instance) may be represented multiple times in the extraction entries because: 1) each extraction entry shows a different path to the step instance (e.g., if there are predicates along the steps of the path, some of these paths may not qualify, so individual paths to the step instance are tracked) and 2) if any of the query nodes represent FOR bindings (e.g., as in the case of the "b" and the "c" query nodes in the query structure in FIG. 10), then the same step instance may be returned more than once. Also, for the extraction entries in FIG. 12, there are two unique <b> document nodes in the SInAPs (i.e., <b> document nodes with SIIDs 3 and 5), and two unique <c> document nodes in the SInAPs (i.e., <c> document nodes with SIIDs 4 and 6).

Embodiments support FOR and LET Semantics in query nodes of the query structure. Through flush point determination, the query processor 130 continues to buffer up extraction entries for a hierarchical document until the query processor 130 reaches the flush point. For query 1750, the flush point is reached when the query processor 130 reaches the end event for the first <b> document node. When the query processor 130 reaches this flush point, the query processor 130 has extraction entries 1910, 1920, 1930, 2000 (FIG. 20) for the <d> document nodes in the hierarchical document. FIG. 20 illustrates extraction entries 1910, 1920, 1930, 2000 in accordance with certain embodiments.

The query processor 130 now has the information needed to return the results for query 1750. The information includes the list of extraction entries identifying unique SInAPs for each step instance and nodes in the query structure appropriately flagged with FOR or LET bindings.

The query processor 130 proceeds to return results for query 1750. First, the query processor 130 looks for query nodes flagged with the FOR binding. In this example, the query processor 130 finds the "b" and the "c" query nodes flagged with FOR bindings. Next, the query processor 130 examines the SInAPs of the extraction entries and stores the SIIDs for the <b> and <c> document nodes. In certain alternative embodiments, the query processor 130 stores the SIIDs for the <b> and <c> document nodes while finding step instances. Then, the query processor 130 sorts the SIIDs for the <b> and <c> document nodes. In this example, the query processor 130 has for the <b> document node: SIIDs 3 and 5, and for the <c> document node: the SIIDs 4 and 6. Since the "//b" step is an ancestor step of "//c" in the path, the query processor 130 determines that the valid SInAPs to iterate on are SInAPs that contain any of these <b> and <c> document node combinations:

1. b(3) and c(4),
2. b(3) and c(6),
3. b(5) and c(6).

The combination b(5) and c(4) is not valid because 5>4 and any b step instance that is an ancestor of any c step instance should have a SIID that is greater in value.

For b(3) and c(4), the query processor 130 has the first and the last extraction entries (i.e., extraction entry 1910 for d(7) and extraction entry 2000 for d(8)), which contain b(3) and c(4). So the query processor 130 returns the sequence d(7), d(8).

For b(3) and c(6), the query processor 130 has the second extraction entry (i.e., extraction entry 1920 for d(7)), which contain b(3) and c(6). So the query processor 130 returns d(7).

For b(5) and c(6), the query processor 130 has the third extraction entry (i.e., extraction entry 1930 for d(7)), which contains b(5) and c(6). So the query processor 130 returns d(7).

Thus, the results of query 1750 are:
1. d(7), d(8)
2. d(7)
3. d(7)

Figure 21:
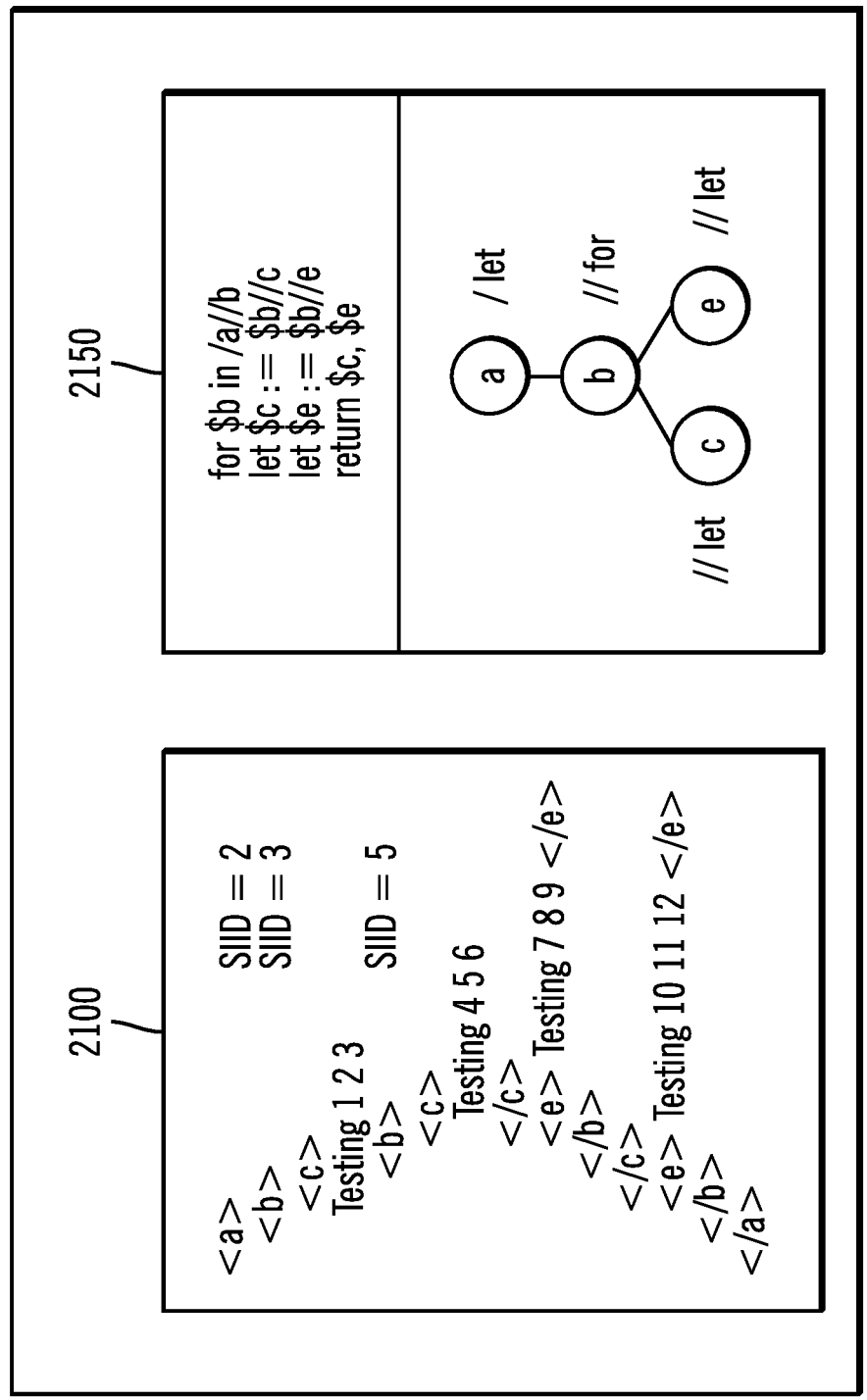
FIG. 21 illustrates a document and a query with multiple extractions and recursive nodes in accordance with certain embodiments.
Figure 22:
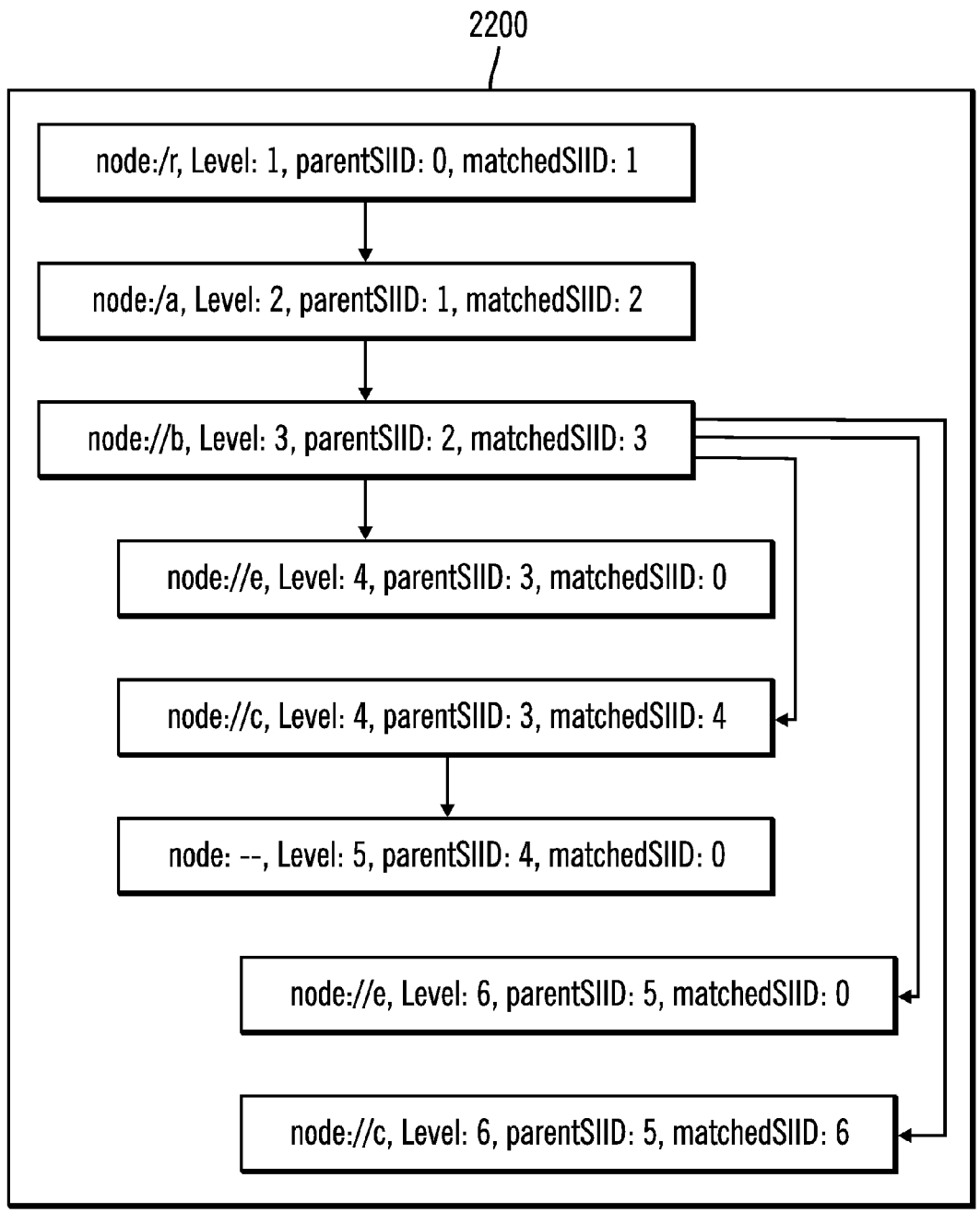
FIG. 22 illustrates a LookingFor structure with multiple branches for a query with multiple extractions and recursive nodes in accordance with certain embodiments.

FIG. 21 illustrates a hierarchical document 2100 and a query 2150 with multiple extractions and recursive nodes in accordance with certain embodiments. In the hierarchical document 2100, SIIDs relevant to this example are shown. FIG. 22 illustrates a LookingFor structure 2200 with multiple branches for a query with multiple extractions and recursive nodes in accordance with certain embodiments. In FIG. 22, the LookingFor structure 2200 is illustrated as it would be after the query processor 130 has reached the second <b> document node, which has an SIID of 5. Continuing, the query processor 130 finds the <e> and <c> document nodes described by steps in the query 2150. FIG. 23 illustrates extraction entries 2310, 2320, 2330, 2340, 2350 created for hierarchical document 2100 and query 2150 with multiple extractions and recursive nodes in accordance with certain embodiments.

Through flush point determination, the query processor 130 continues to buffer up extraction entries for a hierarchical document, until the query processor 130 reaches the flush point. For query 2150, the flush point is reached when the query processor 130 reaches the end event for the first <b> document node. FIG. 24 illustrates additional extraction entries 2310, 2320, 2330, 2340, 2350, 2400 created for hierarchical document 2100 and query 2150 with multiple extractions and recursive nodes in accordance with certain embodiments. When the query processor 130 reaches this flush point, the query processor 130 has extraction entries 2310, 2320, 2330, 2340, 2350, 2400 for the <c> and <e> document nodes in the hierarchical document.

Now that the query processor 130 has two extractions, the query processor 130 finds which <c> extraction entries pair with which <e> extraction entries. The query processor 130 uses the SInAP information in each extraction entry to find pairings. The notion here is a <c> document node (or sequence of <c> document nodes) should pair with a <e> document node (or sequence of <e> document nodes) if they have the same <b> document node as an ancestor. This process is called tuple construction. In this case, the tuple is made up of two sequences: one for the <c> document node and the other for the <e> document node.

Query 2150 has a recursion on the <b> document node, so the query processor 130 first finds <c>,<e> document node pairings with the first <b> document node (with SIID 3) as their ancestor, and then finds <c>, <e> document node pairings with the second <b> document node (with SIID 5) as their ancestor. For the first <b> document node with SIID 3, the query processor 130 returns the <c> document nodes c(4) and c(6) because they both have b(3) in their SInAPs, and the query processor 130 returns the <e> document nodes e(7) and e(8) because they both have b(3) in their SInAPs. Thus, the result is a tuple of two sequences, one is a sequence of <c> document nodes and another is a sequence of <e> document nodes. In this case, the sequence of <c> document nodes is c(4) and c(6), and the sequence of <e> document nodes is e(7) and e(8).

For the second <b> document node with SIID 5, the query processor 130 returns the <c> document node c(6) because this document node has b(5) in the SInAP, and the query processor 130 returns the <e> document node e(7) because this document node has b(5) in the SInAP. Thus, the result is a tuple of two sequences, one a sequence of <c> document nodes and another a sequence of <e> document nodes. In this case, each sequence is a sequence of one item. The sequence for the <c> document node is c(6), and the sequence for the <e> document node is e(7).

Thus, the results of query 2150 are:
1. c(4),c(6) and e(7),e(8)
2. c(6) and e(7).

Logic Diagrams

Figure 25:
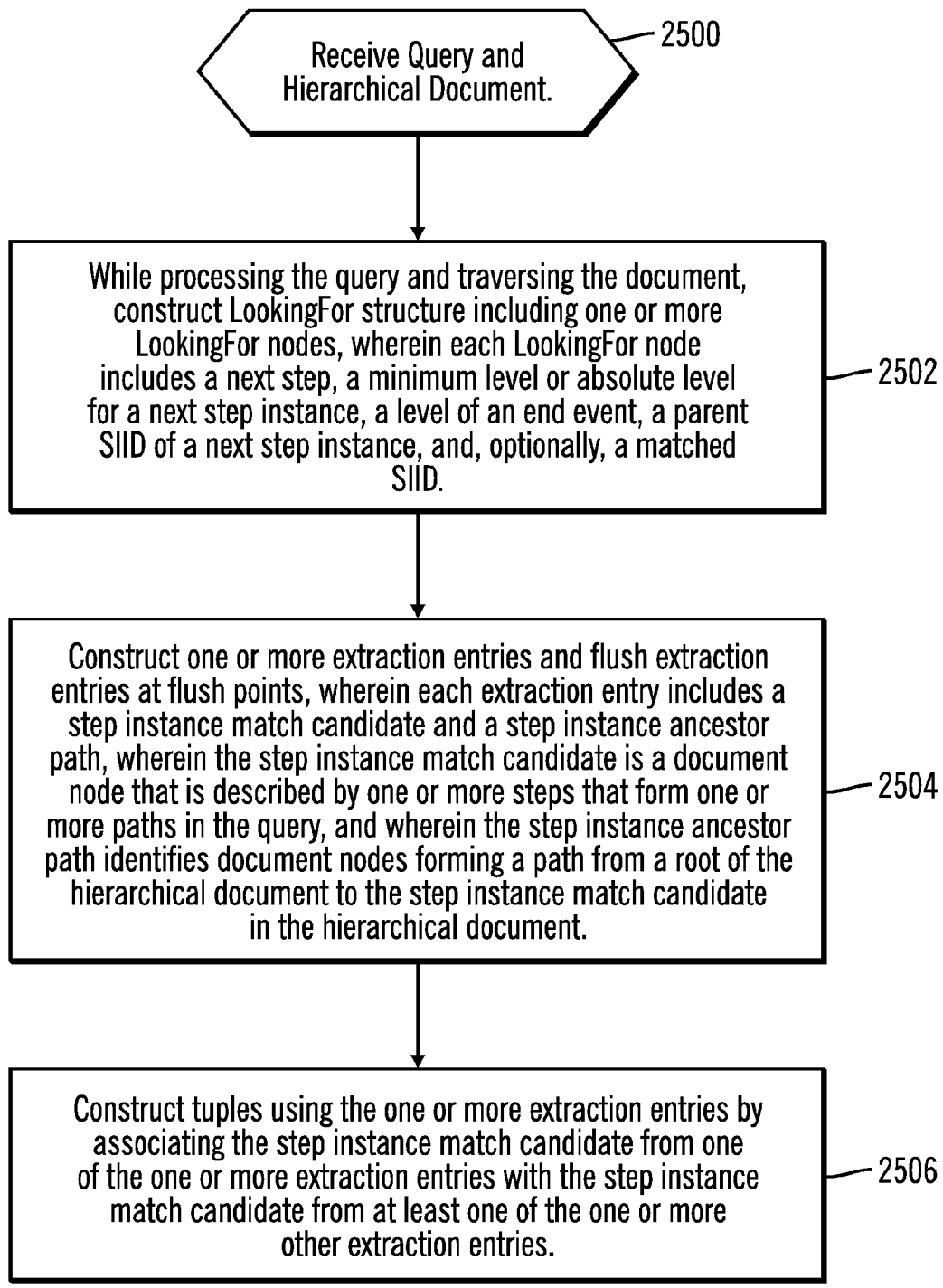
FIG. 25 illustrates logic performed by a query processor to process a query with reference to a document in accordance with certain embodiments.

FIG. 25 illustrates logic performed by the query processor 130 to process a query with reference to a hierarchical document in accordance with certain embodiments. Control begins at block 2500 with the query processor 130 receiving a query and a hierarchical document. The query is formed by one or more paths, and each path includes one or more steps. The hierarchical document includes one or more document nodes. In block 2502, while processing the query and traversing the document, the query processor 130 constructs a LookingFor structure including one or more LookingFor nodes, wherein each LookingFor node includes a next step, a minimum level or absolute level for a next step instance, a level of an end event, a parent SIID of a next step instance, and, optionally, a matched SIID. In block 2504, the query processor 130 constructs one or more extraction entries and flushes the extraction entries at flush points, wherein each extraction entry includes a step instance match candidate and a step instance ancestor path, wherein the step instance match candidate is a document node that is described by one or more steps that form one or more paths in the query, and wherein the step instance ancestor path identifies document nodes forming a path from a root of the hierarchical document to the step instance match candidate in the hierarchical document. In block 2506, the query processor 130 constructs tuples using the one or more extraction entries by associating the step instance match candidate from one of the one or more extraction entries with the step instance match candidate from at least one of the one or more other extraction entries.

Figure 26:
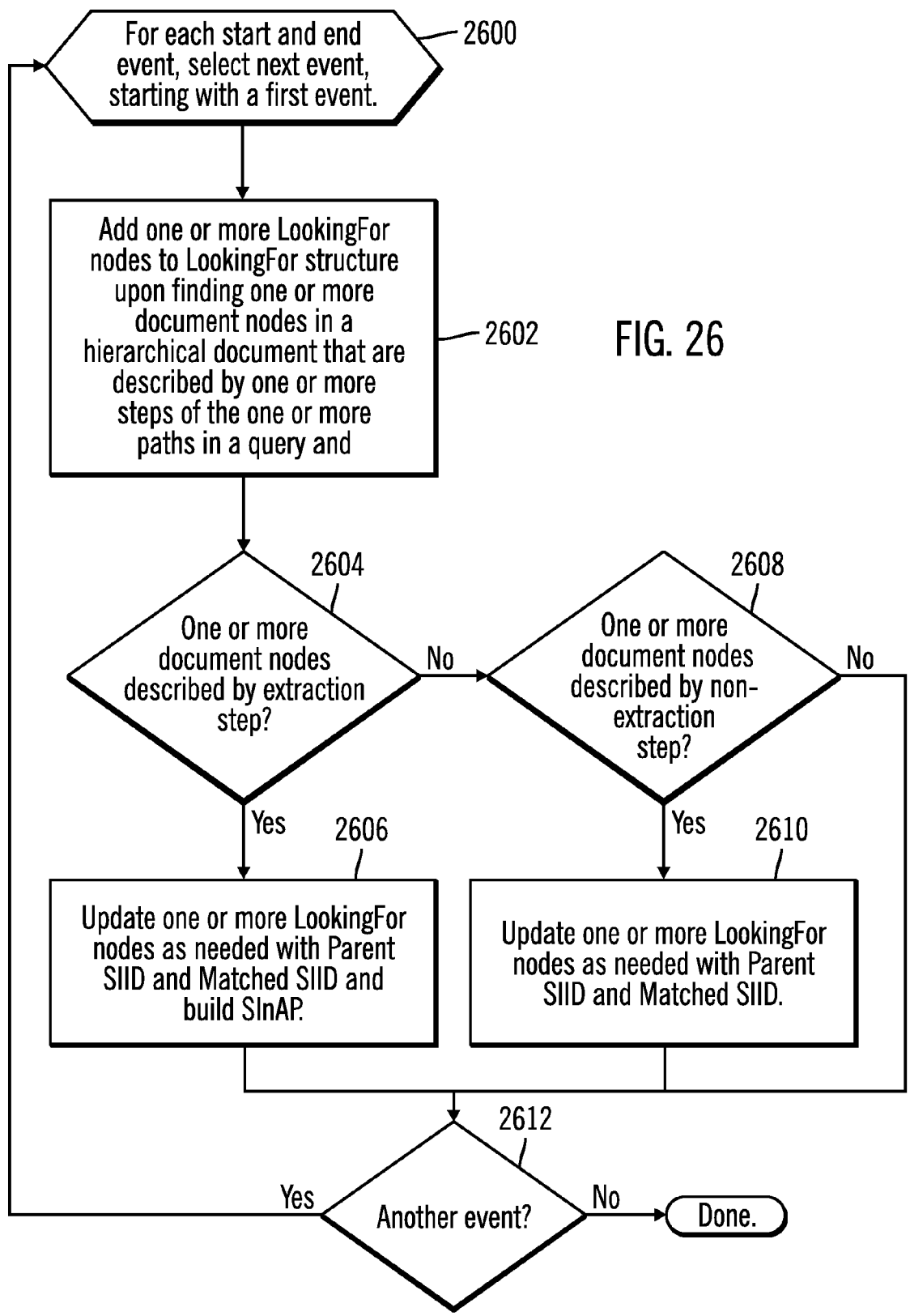
FIG. 26 illustrates logic performed by a query processor to create a LookingFor structure in accordance with certain embodiments.

FIG. 26 illustrates logic performed by the query processor 130 to create a LookingFor structure in accordance with certain embodiments. Control begins at block 2600 with the query processor 130 selecting a next event from among start and end events, starting with a first event. In block 2602, the query processor 130 adds one or more LookingFor nodes to a LookingFor structure upon finding one or more document nodes in a hierarchical document described by one or more steps of the one or more paths in a query and, wherein each LookingFor node includes a next step that is to be performed in subsequent events, a minimum or absolute level for a next step instance, a level of an end event that is to be looked for next, a parent SIID of a next step instance, and, optionally, a matched SIID. In block 2604, the query processor 130 determines whether the one or more document nodes are described by an extraction step. If so, processing continues to block 2606, otherwise, processing continues to block 2608. In block 2606, the query processor 130 updates the one or more LookingFor nodes as needed with a parent SIID and a matched SIID and builds a SInAP. In block 2608, the query processing 130 determines the one or more document nodes are described by a non-extraction step (i.e., a step other than an extraction step). If so, processing continues to block 2610, otherwise, processing continues to block 2612. In block 2610, the query processor 130 updates the one or more LookingFor nodes as needed with a parent SIID and a matched SIID. In block 2612, the query processor 130 determines whether there is another event to process. If so, processing loops back to block 2600, otherwise, processing is done.

Figure 27:
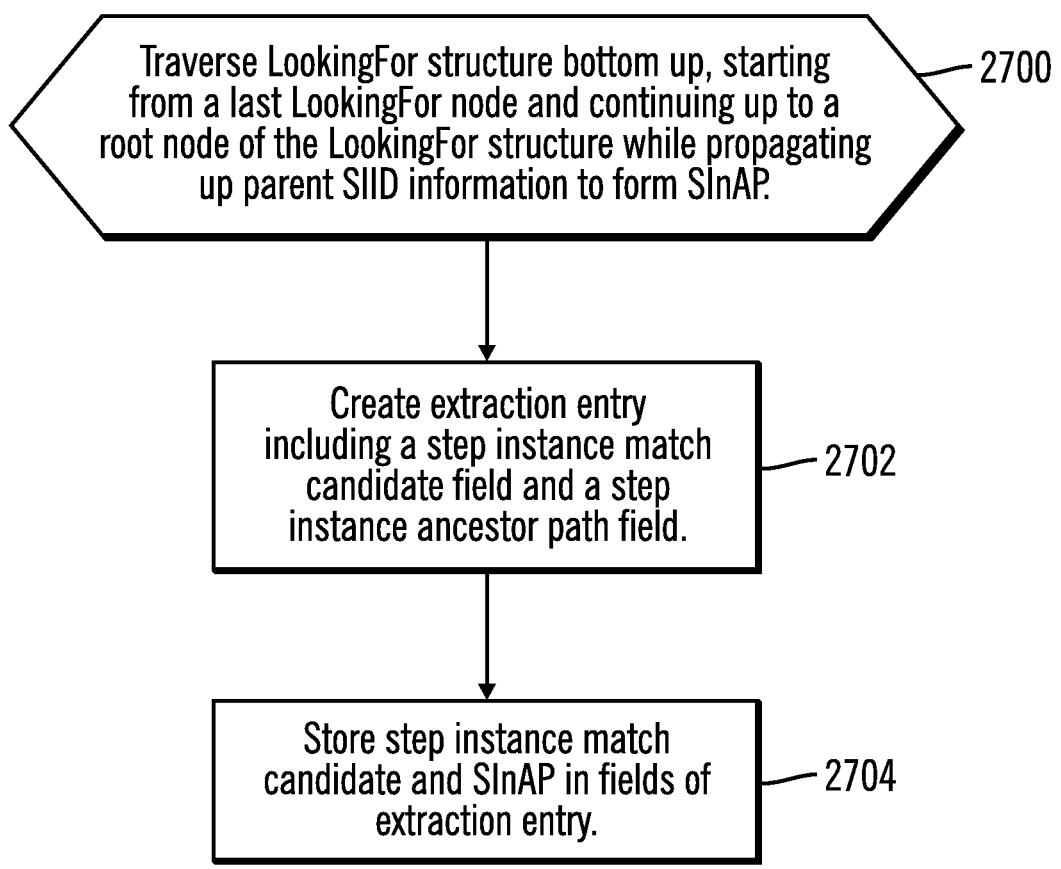
FIG. 27 illustrates logic performed by a query processor to create an extraction entry in accordance with certain embodiments.

FIG. 27 illustrates logic performed by the query processor 130 to create an extraction entry in accordance with certain embodiments. Control begins at block 2700 with the query processor 130 traversing a LookingFor structure bottom up, starting from a last LookingFor node and continuing up to a root node of the LookingFor structure while propagating up parent SIID information to form a SInAP. In block 2702, the query processor 130 creates an extraction entry including a step instance match candidate field and a step instance ancestor path field. In block 2704, the query processor 130 stores a step instance match candidate and a SInAP in fields of the extraction entry.

Figure 28:
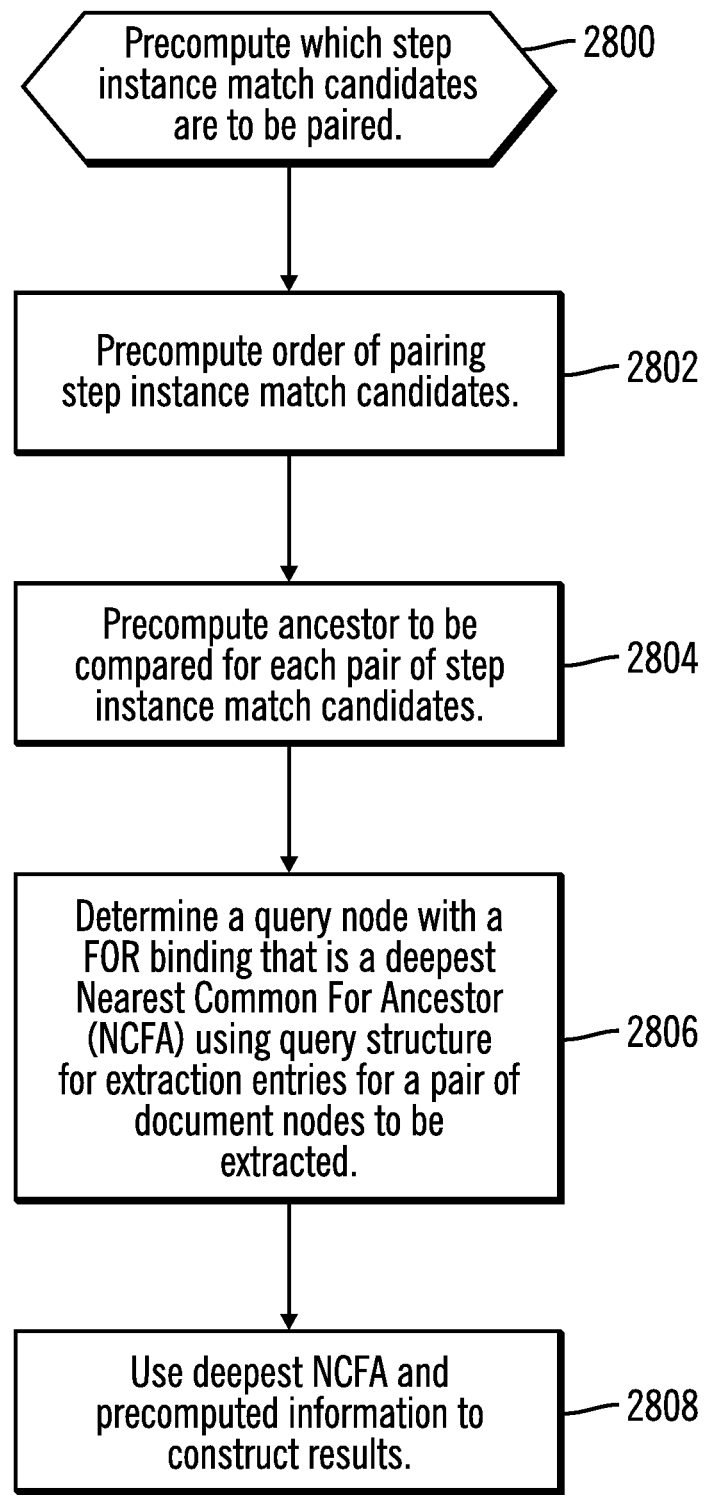
FIG. 28 illustrates logic performed by a query processor to construct tuples in accordance with certain embodiments.

FIG. 28 illustrates logic performed by the query processor 130 to construct tuples in accordance with certain embodiments. Control begins at block 2800 with the query processor 130 precomputing which step instance match candidates are to be paired. In block 2802, the query processor 130 precomputes an order of pairing step instance match candidates. In block 2804, the query processor 130 precomputes ancestors to be compared for each pair of step instance match candidates. In block 2806, the query processor 130 determines a query node with a FOR binding that is a deepest Nearest Common For Ancestor (NCFA) using a query structure for extraction entries for a pair of document nodes to be extracted. In block 2808, the query processor 130 uses the precomputed information to construct tuples. In certain embodiments, the processing of blocks 2802, 2804, and 2806 occurs prior to a query being evaluated with reference to a hierarchical document.

Figure 29A:
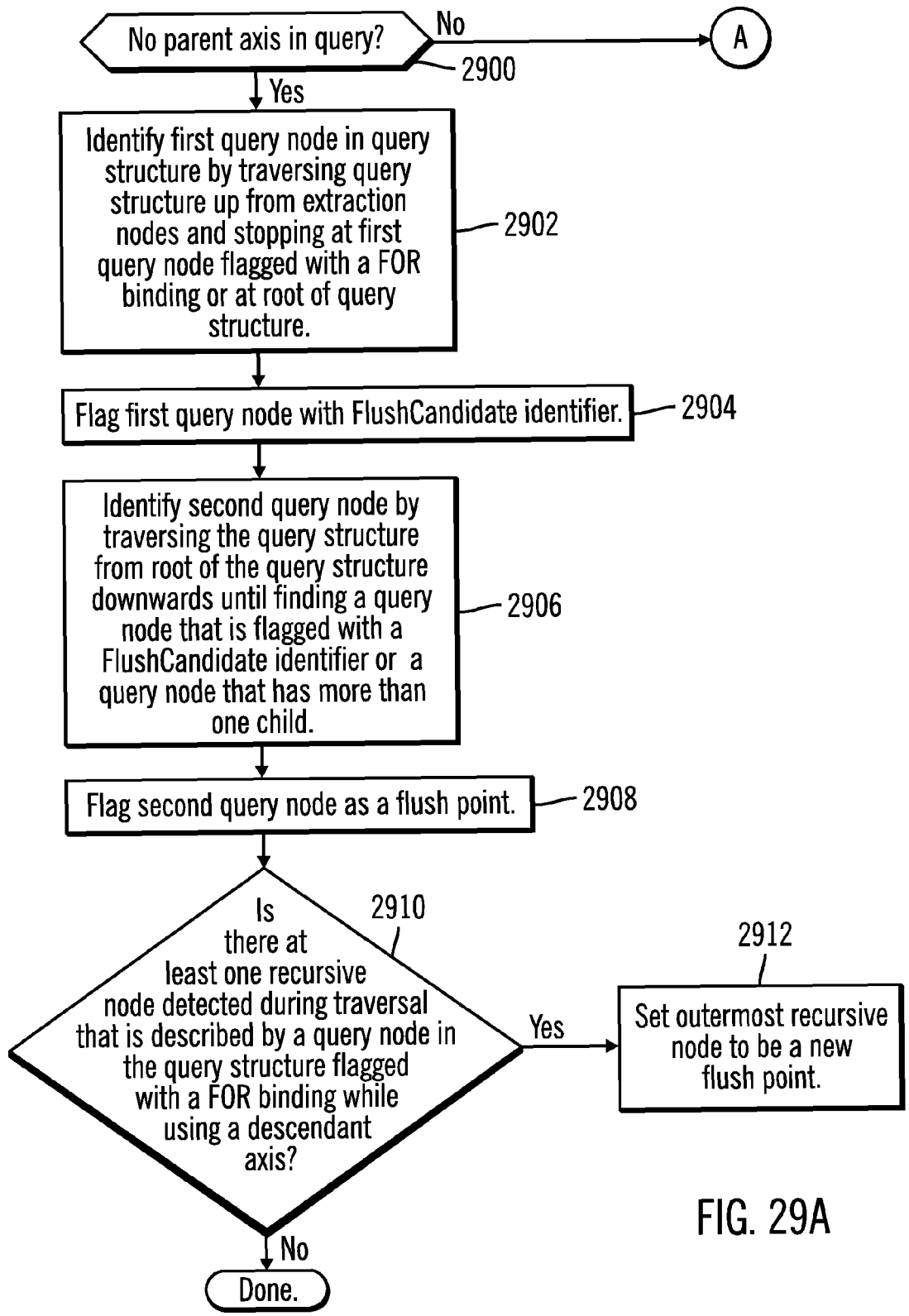
FIGS. 29A and 29B illustrate logic performed by a query processor to determine a flush point in accordance with certain embodiments.
Figure 29B:
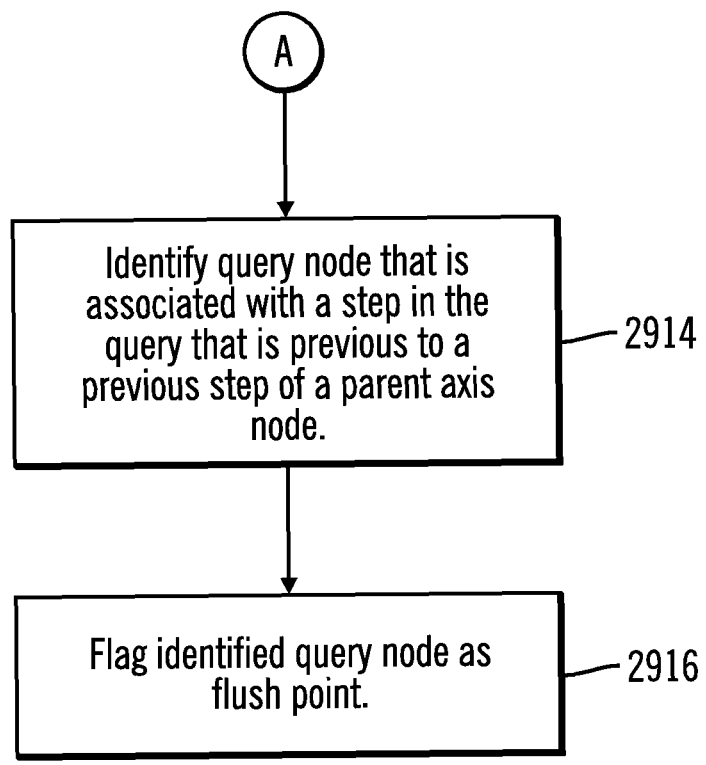

FIGS. 29A and 29B illustrate logic performed by the query processor 130 to determine a flush point in accordance with certain embodiments. Control begins at block 2900 with the query processor 130 determining whether is no parent axis in the query. If there is no parent axis in the query, processing continues to block 2902, otherwise, processing continues to block 2914 (FIG. 29B). In block 2902, the query processor 130 identifies a first query node in a query structure by traversing the query structure up from one or more extraction nodes and stopping at a first query node flagged with a FOR binding or at a root of query structure, if there are no query nodes flagged with FOR bindings. In block 2904, the query processor 130 flags the first query node with a FlushCandidate identifier. In block 2906, the query processor 130 identifies a second query node by traversing the query structure from the root of the query structure downwards until finding a query node that is flagged with a FlushCandidate identifier or a query node that has more than one child. In block 2908, the query processor 130 flags the second query node as the flush point. The first query node and the second query node may be a same query node.

In block 2910, the query processor 130 determines whether there is at least one recursive node detected during traversal of the hierarchical document that is described by any query nodes in the query structure flagged with FOR bindings while using a descendant axis. If so, processing continues to block 2912, otherwise, processing is done. In block 2912, the query processor 130 sets the outermost recursive node to be a new flush point.

In FIG. 29B, in block 2914, the query processor 130 identifies a query node that is associated with a step in the query that is previous to a previous step of a parent axis node. In block 2916, the query processor 130 sets the flush point to the identified query node. For a query /a//b/../g, the /.. for which each step is associated with a query node in a query structure, the parent axis is /.., the previous step of the parent axis node is //b, and the step previous to the previous step of the parent axis node is /a. For this example, the flush point is set to /a.

Figure 30:
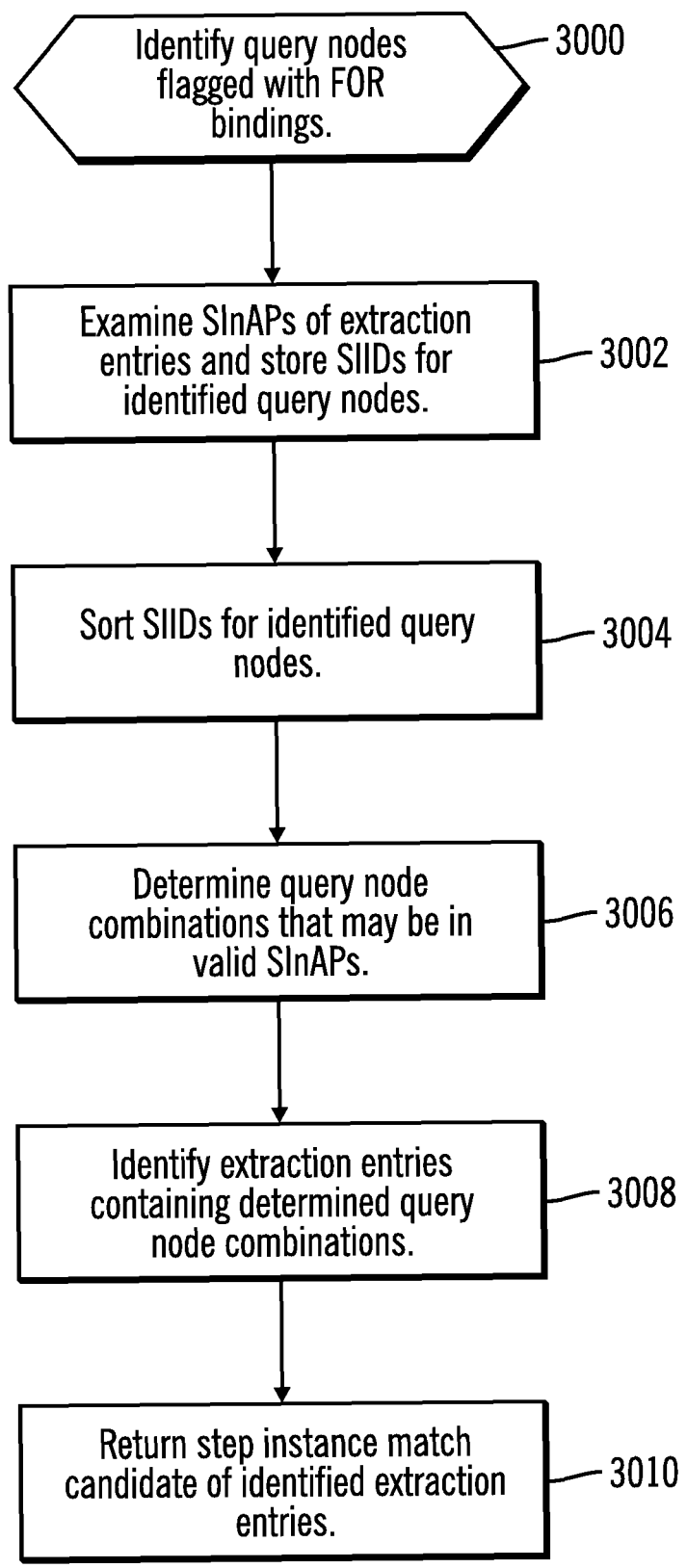
FIG. 30 illustrates logic performed by a query processor to process a document with recursive nodes in accordance with certain embodiments.

FIG. 30 illustrates logic performed by the query processor 130 to process a hierarchical document with recursive nodes in accordance with certain embodiments. Control begins at block 3000 with the query processor 130 identifying query nodes flagged with FOR bindings. In block 3002, the query processor 130 examines SInAPs of extraction entries and stores SIIDs for the identified query nodes. In block 3004, the query processor 130 sorts the SIIDs for the identified query nodes. In block 3006, the query processor determines query node combinations that may be in valid SInAPs. In block 3008, the query processor 130 identifies extraction entries containing the determined query node combinations. In block 3010, the query processor returns step instance match candidates of the identified extraction entries.

Thus, embodiments process queries with respect to hierarchical documents using LookingFor structures and extraction entries to form tuples. With flush point analysis, embodiments return a portion of the before an entire hierarchical document is processed. Also, embodiments are capable of processing recursive cases.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk-read only memory (CD-ROM), compact disk-read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 25-30 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 25-30 may be implemented in software, hardware, programmable and non-programmable gate array logic or in some combination of hardware, software, or gate array logic.

Figure 31:
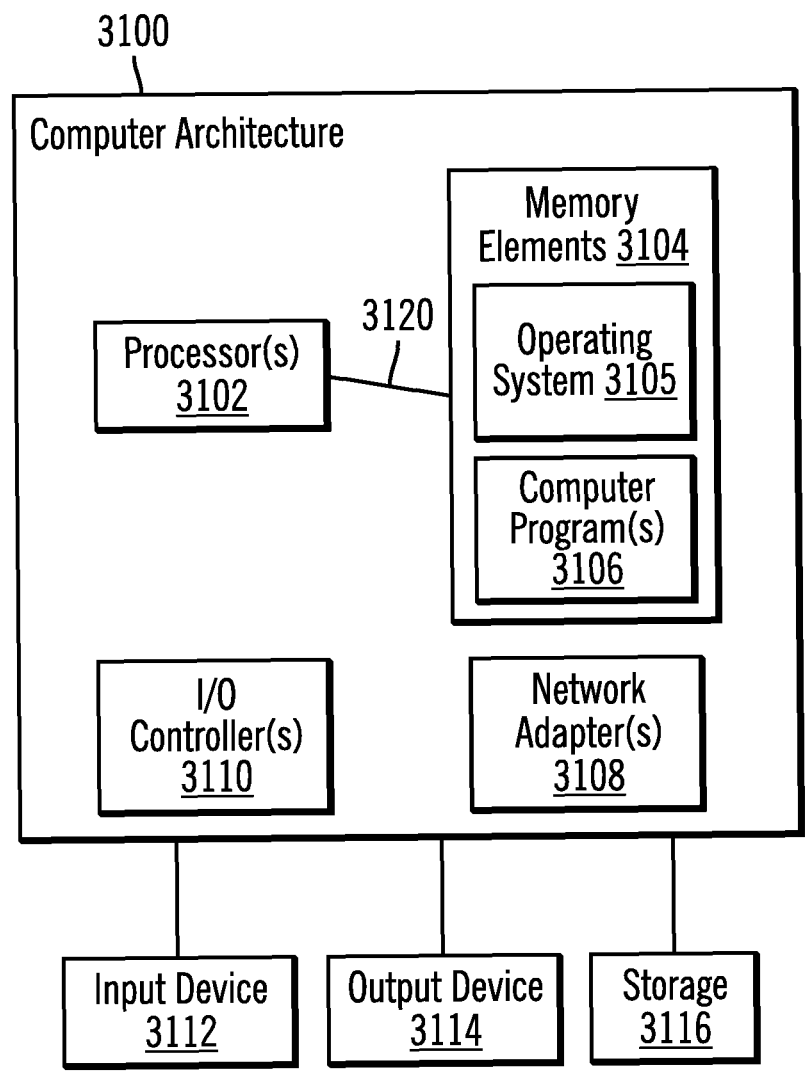
FIG. 31 illustrates a system architecture that may be used in accordance with certain embodiments.

FIG. 31 illustrates a system architecture 3100 that may be used in accordance with certain embodiments. Client computer 100 and/or server computer 120 may implement system architecture 3100. The system architecture 3100 is suitable for storing and/or executing program code and includes at least one processor 3102 coupled directly or indirectly to memory elements 3104 through a system bus 3120. The memory elements 3104 may include local memory employed during actual execution of the program code, bulk storage, and cache memories which provide temporary storage of at least some program code in order to reduce the number of times code must be retrieved from bulk storage during execution. The memory elements 3104 include an operating system 3105 and one or more computer programs 3106.

Input/Output (I/O) devices 3112, 3114 (including but not limited to keyboards, displays, pointing devices, etc.) may be coupled to the system either directly or through intervening I/O controllers 3110.

Network adapters 3108 may also be coupled to the system to enable the data processing system to become coupled to other data processing systems or remote printers or storage devices through intervening private or public networks. Modems, cable modem and Ethernet cards are just a few of the currently available types of network adapters 3108.

The system architecture 3100 may be coupled to storage 3116 (e.g., a non-volatile storage area, such as magnetic disk drives, optical disk drives, a tape drive, etc.). The storage 3116 may comprise an internal storage device or an attached or network accessible storage. Computer programs 3106 in storage 3116 may be loaded into the memory elements 3104 and executed by a processor 3102 in a manner known in the art.

The system architecture 3100 may include fewer components than illustrated, additional components not illustrated herein, or some combination of the components illustrated and additional components. The system architecture 3100 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method of determining a flush point, comprising:
   receiving, with a computer including a processor, a query, wherein the query is formed by one or more paths, and wherein each path includes one or more steps, wherein a query structure represents the query, wherein the query structure includes query nodes, and wherein each of the query nodes is flagged with a FOR binding or a LET binding;
   receiving a hierarchical document including one or more document nodes;
   determining whether there is a parent axis in the query;
   in response to determining that there is no parent axis in the query,
      identifying a first query node in the query structure by traversing the query structure up from one or more extraction nodes and stopping at a first one of the query node flagged with the FOR binding from among the query nodes or a root node of the query structure;

flagging the first query node as a flush candidate;

identifying a second query node by traversing the query structure from the root node of the query structure downwards until finding the query node that is flagged with a FlushCandidate identifier or the query node that has more than one child from among the query nodes; and flagging the second query node as the flush point.

2. The method of claim 1, further comprising:

determining whether there is at least one recursive node in the hierarchical document detected during traversal of the hierarchical document that is described by the query node in the query structure flagged with the FOR binding from among the query nodes while using a descendant axis; and in response to determining that there is at least one recursive node, setting an outermost recursive node to be a new flush point.

3. The method of claim 1, further comprising:

in response to determining that there is a parent axis in the query, identifying a third query node that is associated with a step that is previous to a previous step of the parent axis; and flagging the third node as the flush point.

4. A computer program product for determining a flush point comprising:

a non-transitory computer-readable medium storing a computer readable program, wherein the computer readable program, when executed by a processor on a computer, causes the computer to:

receive a query, wherein the query is formed by one or more paths, and wherein each path includes one or more steps, wherein a query structure represents the query, wherein the query structure includes query nodes, and wherein each of the query nodes is flagged with a FOR binding or a LET binding;

receive a hierarchical document including one or more document nodes;

determine whether there is a parent axis in the query;

in response to determining that there is no parent axis in the query, identify a first query node in the query structure by traversing the query structure up from one or more extraction nodes and stopping at a first one of the query node flagged with the FOR binding from among the query nodes or a root node of the query structure;

flag the first query node as a flush candidate;

identify a second query node by traversing the query structure from the root node of the query structure downwards until finding the query node that is flagged with a FlushCandidate identifier or the query node that has more than one child from among the query nodes; and flag the second query node as the flush point.

5. The computer program product of claim 4, wherein the computer readable program when executed on a computer causes the computer to:

determine whether there is at least one recursive node in the hierarchical document detected during traversal of the hierarchical document that is described by the query node in the query structure flagged with the FOR binding from among the query nodes while using a descendant axis; and in response to determining that there is at least one recursive node, set an outermost recursive node to be a new flush point.

6. The computer program product of claim 4, wherein the computer readable program when executed on a computer causes the computer to:

in response to determining that there is a parent axis in the query, identify a third query node that is associated with a step that is previous to a previous step of the parent axis; and flag the third node as the flush point.

7. A system of determining a flush point, comprising:

a processor; and storage coupled to the processor, wherein the storage stores a computer program, and wherein the processor is configured to execute the computer program to perform operations, and wherein the operations comprise:

receiving a query, wherein the query is formed by one or more paths, and wherein each path includes one or more steps, wherein a query structure represents the query, wherein the query structure includes query nodes, and wherein each of the query nodes is flagged with a FOR binding or a LET binding;

receiving a hierarchical document including one or more document nodes;

determining whether there is a parent axis in the query;

in response to determining that there is no parent axis in the query, identifying a first query node in the query structure by traversing the query structure up from one or more extraction nodes and stopping at a first one of the query node flagged with the FOR binding from among the query nodes or a root node of the query structure;

flagging the first query node as a flush candidate;

identifying a second query node by traversing the query structure from the root node of the query structure downwards until finding the query node that is flagged with a FlushCandidate identifier or the query node that has more than one child from among the query nodes; and flagging the second query node as the flush point.

8. The system of claim 7, wherein the operations further comprise:

determining whether there is at least one recursive node in the hierarchical document detected during traversal of the hierarchical document that is described by the query node in the query structure flagged with a FOR binding while using a descendant axis; and in response to determining that there is at least one recursive node, setting an outermost recursive node to be a new flush point.

9. The system of claim 7, wherein the operations further comprise:

in response to determining that there is a parent axis in the query, identifying a third query node that is associated with a step that is previous to a previous step of the parent axis; and flagging the third node as the flush point.

* * * * *